(12) United States Patent
Chen et al.

(10) Patent No.: US 12,381,612 B2
(45) Date of Patent: Aug. 5, 2025

(54) UPLINK TRANSMISSION CHARACTERISTIC CONFIRMATION METHOD, INFORMATION REPORT METHOD AND DEVICE

(71) Applicant: DATANG MOBILE COMMUNICATIONS EQUIPMENT CO., LTD., Beijing (CN)

(72) Inventors: Runhua Chen, Beijing (CN); Hui Li, Beijing (CN); Yajuan Luo, Beijing (CN); Qiubin Gao, Beijing (CN)

(73) Assignee: Datang Mobile Communications Equipment Co., Ltd, Beijing (CN)

( * ) Notice: Subject to any disclaimer, the term of this patent is extended or adjusted under 35 U.S.C. 154(b) by 337 days.

(21) Appl. No.: 17/799,437

(22) PCT Filed: Nov. 26, 2020

(86) PCT No.: PCT/CN2020/131717
§ 371 (c)(1),
(2) Date: Aug. 12, 2022

(87) PCT Pub. No.: WO2021/159801
PCT Pub. Date: Sep. 19, 2021

(65) Prior Publication Data
US 2023/0344499 A1    Oct. 26, 2023

(30) Foreign Application Priority Data
Feb. 12, 2020   (CN) .......................... 202010089271.4

(51) Int. Cl.
*H04B 7/06*      (2006.01)
*H04B 7/0404*    (2017.01)
*H04B 7/08*      (2006.01)

(52) U.S. Cl.
CPC ......... *H04B 7/0695* (2013.01); *H04B 7/0404* (2013.01); *H04B 7/088* (2013.01)

(58) Field of Classification Search
CPC .. H04B 7/0695; H04B 7/0404; H04B 7/0691; H04B 7/088; H04B 7/0626;
(Continued)

(56) References Cited

U.S. PATENT DOCUMENTS

2020/0107341 A1   4/2020   Zhang et al.
2021/0076342 A1   3/2021   Yu et al.
(Continued)

FOREIGN PATENT DOCUMENTS

CN    10941771 A     3/2019
CN    109495879 A    3/2019
(Continued)

OTHER PUBLICATIONS

Written Opinion and International Search Report dated Feb. 22, 2021 for International Application No. PCT/CN2020/131717.
(Continued)

*Primary Examiner* — Golam Sorowar
(74) *Attorney, Agent, or Firm* — Harness, Dickey & Pierce, P.L.C.

(57) ABSTRACT

Embodiments of the present disclosure provide an uplink transmission characteristics confirmation method, includes: obtaining, by a terminal, first information, wherein the first information includes information reported by the terminal to a network side device or information received by the terminal from the network side device; determining uplink transmission characteristic of the terminal, wherein the uplink transmission characteristic is an antenna panel for the uplink transmission determined by terminal according to the first information, or the uplink transmission characteristic is determined by the terminal according to the first information (Continued)

and second information, and the second information includes panel relationship information of the terminal.

13 Claims, 7 Drawing Sheets

(58) Field of Classification Search
CPC .. H04B 7/0456; H04B 7/0408; H04B 7/0617; H04B 7/0628; H04B 7/024; H04B 7/063; H04B 7/0632; H04B 7/0413; H04B 7/0417; H04B 7/0469; H04B 17/309; H04B 17/318; H04B 17/373; H04B 7/0486; H04L 5/0048; H04L 5/0023; H04L 5/0051; H04L 5/0053; H04L 5/0094; H04L 5/0091; H04L 5/0057; H04L 5/0044; H04L 5/001; H04L 5/0035; H04L 25/0226; H04L 5/0064; H04L 5/0007; H04L 5/0092; H04L 5/0055; H04L 1/0026; H04L 1/1861; H04L 5/005; H04L 1/1671; H04L 1/181; H04W 72/23; H04W 72/046; H04W 24/10; H04W 52/146; H04W 52/42; H04W 72/1268; H04W 52/242; H04W 72/21; H04W 56/001; H04W 16/28; H04W 8/24; H04W 52/365; H04W 52/367; H04W 52/325; H04W 72/542; H04W 24/08; H04W 72/51; H04W 52/0229

See application file for complete search history.

(56) References Cited

U.S. PATENT DOCUMENTS

| | | | |
|---|---|---|---|
| 2021/0288711 | A1 | 9/2021 | Cao |
| 2021/0336737 | A1 | 10/2021 | Li |
| 2022/0167274 | A1* | 5/2022 | Wang .................. H04L 5/0064 |

FOREIGN PATENT DOCUMENTS

| | | |
|---|---|---|
| CN | 110224802 A | 9/2019 |
| CN | 110505695 A | 11/2019 |
| WO | WO-2019/158186 A1 | 8/2019 |
| WO | WO-2020/062444 A1 | 4/2020 |

OTHER PUBLICATIONS

Chinese Office Action for Application No. 202010089271.4 dated Apr. 18, 2022.
Interdigital, Inc., "MPUE and Panel Specific Uplink Transmission", Agenda Item 7.2.8.3, 3GPP TSG RAN WG1 #96b, R1-1904861, Apr. 8-12, 2019, Xi'an, China.
Extended European Search Report issued May 9, 2023 in European Application No. 20919099.0.
LG Electronics: "Feature Lead summary of Enhancements on Multi-beam Operations", 3GPP Draft; R1-1903686 RI#96, Mar. 3, 2019.

* cited by examiner network side device

11 terminal

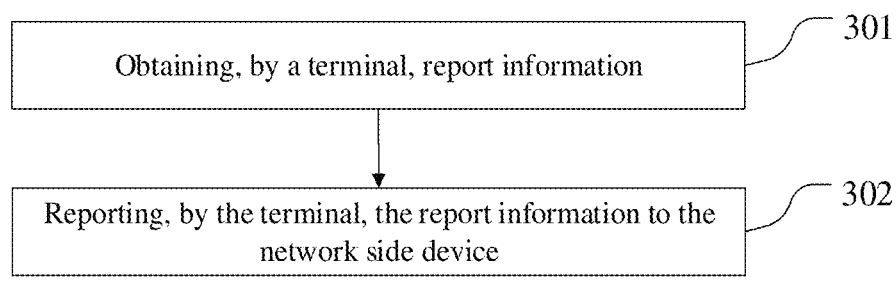
FIG. 3
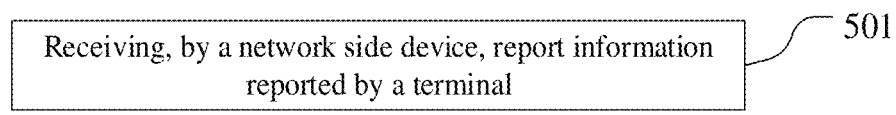
FIG. 4
FIG. 5

UPLINK TRANSMISSION CHARACTERISTIC CONFIRMATION METHOD, INFORMATION REPORT METHOD AND DEVICE

CROSS-REFERENCE TO RELATED APPLICATIONS

This application is the U.S. national phase of PCT Application No. PCT/CN2020/131717 filed on Nov. 26, 2020, which claims priorities of the Chinese patent application No. 202010089271.4 filed on Feb. 12, 2020, which are incorporated herein by reference in their entireties.

TECHNICAL FIELD

The present disclosure relates to the field of communications technology, in particular to an uplink transmission characteristic confirmation method, an information report method and device.

BACKGROUND

Some communication systems (e.g. 5G systems) terminals support multiple transmission characteristics, for example, terminals support multiple antenna panels, that is, terminals with multiple antenna panels. However, the network side device currently cannot obtain the relevant information for the uplink transmission characteristics or the antenna panels of the terminal, so that the network side device obtains too little available information of the terminal.

SUMMARY

Embodiments of the present disclosure provide an uplink transmission characteristics confirmation method, an information report method and device, so as to solve the problem that the network side device obtains too little available information of the terminal.

An embodiment of the present disclosure provide an uplink transmission characteristics confirmation method, includes: obtaining, by a terminal, first information, wherein the first information includes information reported by the terminal to a network side device or information received by the terminal from the network side device; determining uplink transmission characteristic of the terminal, wherein the uplink transmission characteristic is an antenna panel for the uplink transmission determined by the terminal according to the first information, or the uplink transmission characteristic is determined by the terminal according to the first information and second information, and the second information includes panel relationship information of the terminal.

Optionally, in the case that the uplink transmission characteristic is the antenna panel of uplink transmission determined by the terminal according to the first information: the information received by the terminal from the network side device includes a downlink signal, and the downlink signal is used to indicate uplink beam information used by the terminal or indicate information of the antenna panel for the uplink transmission.

Optionally, the downlink signal is associated with the antenna panel for the uplink transmission; or the uplink beam information is associated with the antenna panel for the uplink transmission.

Optionally, associating the downlink signal with the antenna panel for uplink transmission includes: associating the downlink signal with antenna panel information of the antenna panel for uplink transmission.

Optionally, the antenna panel information may include but is not limited to the following items: an identifier of the antenna panel for the uplink transmission; an identifier of a sounding reference signal (SRS) resource for the uplink transmission; an identifier of a SRS resource set for the uplink transmission; an identifier of a SRS resource group for the uplink transmission.

Optionally, the associating the downlink signal with the antenna panel for the uplink transmission is configured by the network side to the terminal.

Optionally, in the case that the uplink transmission characteristic is the antenna panel for uplink transmission determined by the terminal according to the first information: the information reported by the terminal to the network side device is used to report the antenna panel information for the uplink transmission.

Optionally, the information reported by the terminal to the network side device is: information reported by the terminal most recently before determining the antenna panel for uplink transmission.

Optionally, the information reported by the terminal to the network side device includes: information reported by the terminal according to the measurement result of the downlink reference signal of the network side device, and the report information includes reference signal resource indication information and the antenna panel information for the uplink transmission.

Optionally, in the case that the uplink transmission characteristic is an uplink transmission characteristic determined by the terminal according to the first information and the second information: the panel relationship information includes: panel relationship information between uplink transmission and downlink reception of the terminal.

Optionally, the panel relationship information between uplink transmission and downlink transmission of the terminal, including: the relationship information between the antenna panel information for the uplink transmission and the antenna panel information for downlink reception of the terminal; or the relationship information between transmission characteristic information of the panel of the terminal for uplink transmission and the reception characteristic information of the panel of the terminal for downlink reception.

Optionally, the antenna panel information may include the following: an identifier of the antenna panel for the uplink transmission; an identifier of an SRS resource for the uplink transmission; an identifier of an SRS resource set for the uplink transmission; an identifier of an SRS resource group for the uplink transmission.

Optionally, the transmission characteristic information may include, but is not limited to, at least one of the following: a spatial filter for uplink transmission, a transmission beam for uplink transmission, a power control for uplink transmission, a timing for uplink transmission and Doppler information for uplink transmission; and/or, the reception characteristic information may include, but is not limited to, at least one of the following: a spatial filter of downlink transmission, a transmission beam for downlink transmission, a path loss for downlink transmission, a timing for downlink transmission and Doppler information for downlink transmission.

Optionally, the panel relationship information is predefined, configured by the network side to the terminal, or reported by the terminal to the network side.

Optionally, in the case that the uplink transmission characteristic is an uplink transmission characteristic determined by the terminal according to the first information and the second information: the uplink transmission characteristics include at least one of the following: an antenna panel for uplink transmission, a spatial filter for uplink transmission, a transmission beam for uplink transmission, a power control for uplink transmission, a timing for uplink transmission and a Doppler pre-compensation for uplink transmission.

Optionally, the method further includes: reporting, by the terminal, the uplink transmission characteristic to the network side device.

An embodiment of the present disclosure provides an information report method, includes: obtaining, by a terminal, report information, wherein the report information includes information of an antenna panel of the terminal, and/or the report information is obtained based on the information of the antenna panel indicated by the network side device; reporting, by the terminal, the report information to the network side device.

Optionally, the report information is a measurement result, wherein the measurement result is measured by the terminal based on the indication information sent by the network side device.

Optionally, in the case that the report information is obtained based on the information of the antenna panel indicated by the network side device: the information of the antenna panel indicated by the network side device may be the information of the antenna panel of the terminal included in the indication information; or in the case that the report information includes the information of the antenna panel of the terminal: the information of the antenna panel of the terminal may be the information of the antenna panel of the terminal included in the measurement result; or in the case that the report information includes information of the antenna panel of the terminal, and the report information is obtained based on the information of the antenna panel indicated by the network side device: the information of the antenna panel indicated by the network side device may be the information of the antenna panel of the terminal included in the indication information, and the information of the antenna panel of the terminal may be the information of the antenna panel of the terminal included in the measurement result.

Optionally, the antenna panel information may include but is not limited to the following items: an identifier of the antenna panel for measurement; an identifier of a sounding reference signal (SRS) resource for measurement; an identifier of a SRS resource set for measurement; an identifier of a SRS resource group for measurement.

Optionally, in the case that the report information includes information of the antenna panel of the terminal: the report information is assistant information used to assist in determining the antenna panel of the terminal for uplink transmission.

Optionally, the report information includes at least one of the following: a number of antenna panels of the terminal, an activation time of the antenna panels, and a number of ports of the antenna panels.

Optionally, the antenna panel associated with the report information is an antenna panel that can be activated and used for uplink transmission.

Optionally, the report information is used to explicitly report the antenna panel information of the terminal, or the report information is implicitly reported as the capability of the terminal.

Optionally, the method further includes: receiving, by the terminal, configuration information sent by the network side device, wherein the configuration information is used for antenna panel information of the terminal for uplink transmission.

Optionally, the method further includes: determining, by the terminal, the antenna panel for the uplink transmission according to the configuration information.

An embodiment of the present disclosure provides an uplink transmission characteristics conformation method, includes: determining, by a network side device, uplink transmission characteristic of the terminal, wherein the uplink transmission characteristic is an antenna panel for the uplink transmission determined by the network side device according to the first information, or the uplink transmission characteristic is determined by the network side device according to the first information and second information, and the second information includes panel relationship information of the terminal; wherein the first information includes information reported by the terminal to the network side device or information sent by the network side device to the terminal.

Optionally, in the case that the uplink transmission characteristic is the antenna panel of uplink transmission determined by the network side device according to the first information: the information sent by the network side device to the terminal includes a downlink signal, and the downlink signal is used to indicate uplink beam information used by the terminal or indicate information of the antenna panel for the uplink transmission.

Optionally, the downlink signal is associated with the antenna panel for the uplink transmission; or the uplink beam information is associated with the antenna panel for the uplink transmission.

Optionally, associating the downlink signal with the antenna panel for uplink transmission includes: associating the downlink signal with antenna panel information of the antenna panel for uplink transmission.

Optionally, the antenna panel information may include but is not limited to the following items: an identifier of the antenna panel for the uplink transmission; an identifier of a sounding reference signal (SRS) resource for the uplink transmission; an identifier of a SRS resource set for the uplink transmission; an identifier of a SRS resource group for the uplink transmission.

Optionally, the associating the downlink signal with the antenna panel for the uplink transmission is configured by the network side to the terminal.

Optionally, in the case that the uplink transmission characteristic is the antenna panel for uplink transmission determined by the network side device according to the first information: the information reported by the terminal to the network side device is used to report the antenna panel information for the uplink transmission.

Optionally, the information reported by the terminal to the network side device is: information reported by the terminal most recently before determining the antenna panel for uplink transmission.

Optionally, the information reported by the terminal to the network side device includes: information reported by the terminal according to the measurement result of the downlink reference signal of the network side device, and the report information includes reference signal resource indication information and the antenna panel information for the uplink transmission.

Optionally, in the case that the uplink transmission characteristic is an uplink transmission characteristic determined by the terminal according to the first information and the second information: the panel relationship information includes: panel relationship information between uplink transmission and downlink reception of the terminal.

Optionally, the panel relationship information between uplink transmission and downlink transmission of the terminal, including: the relationship information between the antenna panel information for the uplink transmission and the antenna panel information for downlink reception of the terminal; or the relationship information between transmission characteristic information of the panel of the terminal for uplink transmission and the reception characteristic information of the panel of the terminal for downlink reception.

Optionally, the antenna panel information may include the following: an identifier of the antenna panel for the uplink transmission; an identifier of an SRS resource for the uplink transmission; an identifier of an SRS resource set for the uplink transmission; an identifier of an SRS resource group for the uplink transmission.

Optionally, The transmission characteristic information may include, but is not limited to, at least one of the following: a spatial filter for uplink transmission, a transmission beam for uplink transmission, a power control for uplink transmission, a timing for uplink transmission and Doppler information for uplink transmission; and/or, the reception characteristic information may include, but is not limited to, at least one of the following: a spatial filter of downlink transmission, a transmission beam for downlink transmission, a path loss for downlink transmission, a timing for downlink transmission and Doppler information for downlink transmission.

Optionally, the panel relationship information is predefined, configured by the network side to the terminal, or reported by the terminal to the network side.

Optionally, in the case that the uplink transmission characteristic is an uplink transmission characteristic determined by the terminal according to the first information and the second information: the uplink transmission characteristics include at least one of the following: an antenna panel for uplink transmission, a spatial filter for uplink transmission, a transmission beam for uplink transmission, a power control for uplink transmission, a timing for uplink transmission and a Doppler pre-compensation for uplink transmission.

Optionally, the method further includes: receiving, by the network side device, the uplink transmission characteristic reported by the terminal.

An embodiment of the present disclosure provides an information report method, includes: receiving, by a network side device, report information reported by a terminal, wherein the report information includes information of an antenna panel of the terminal, and/or the report information is obtained based on the information of the antenna panel indicated by the network side device.

Optionally, the report information is a measurement result, wherein the measurement result is measured by the terminal based on the indication information sent by the network side device.

Optionally, in the case that the report information is obtained based on the antenna panel information indicated by the network side device: the antenna panel information indicated by the network side device is the antenna panel information of the terminal included in the indication information; or in the case that the report information includes information of the antenna panel of the terminal: the information of the antenna panel of the terminal may be the antenna panel information of the terminal included in the measurement result; or in the case that the report information includes the information of the antenna panel of the terminal, and the report information is obtained based on the antenna panel information indicated by the network side device: the antenna panel information indicated by the network side device is the antenna panel information of the terminal included in the indication information, and the information of the antenna panel of the terminal is the antenna panel information of the terminal included in the measurement result Optionally, the antenna panel information may include but is not limited to the following items: an identifier of the antenna panel for the uplink transmission; an identifier of a sounding reference signal (SRS) resource for the uplink transmission; an identifier of a SRS resource set for the uplink transmission; an identifier of a SRS resource group for the uplink transmission.

Optionally, in the case that the report information includes information of the antenna panel of the terminal: the report information is assistant information used to assist in determining the antenna panel of the terminal for uplink transmission.

Optionally, the report information includes at least one of the following: a number of antenna panels of the terminal, an activation time of the antenna panels, and a number of ports of the antenna panels.

Optionally, the antenna panel associated with the report information is an antenna panel that can be activated and used for uplink transmission.

Optionally, the report information is used to explicitly report the antenna panel information of the terminal, or the report information is implicitly reported as the capability of the terminal.

Optionally, the method further includes: sending, by the network side device, configuration information to the terminal, wherein the configuration information is used for antenna panel information of the terminal for uplink transmission.

An embodiment of the present disclosure provides a terminal, includes: an acquisition module, configured to obtain first information, wherein the first information includes information reported by the terminal to a network side device or information received by the terminal from the network side device; a determining module, configured to determine uplink transmission characteristic of the terminal, wherein the uplink transmission characteristic is an antenna panel for the uplink transmission determined by the terminal according to the first information, or the uplink transmission characteristic is determined by the terminal according to the first information and second information, and the second information includes panel relationship information of the terminal.

An embodiment of the present disclosure provides a terminal, includes: an obtaining module, configured to obtain report information, wherein the report information includes information of an antenna panel of the terminal, and/or the report information is obtained based on the information of the antenna panel indicated by the network side device; a reporting module, configured to report the report information to the network side device.

An embodiment of the present disclosure provides a network side device, includes: a determination module, configured to determine uplink transmission characteristic of the terminal, wherein the uplink transmission characteristic is an antenna panel for the uplink transmission determined by the network side device according to the first information, or the uplink transmission characteristic is determined by the network side device according to the first information and second information, and the second information includes panel relationship information of the terminal; wherein the first information includes information reported by the terminal to the network side device or information sent by the network side device to the terminal.

An embodiment of the present disclosure provides a network side device, includes: a receiving module, configured to receive report information reported by a terminal, wherein the report information includes information of an antenna panel of the terminal, and/or the report information is obtained based on the information of the antenna panel indicated by the network side device.

An embodiment of the present disclosure provides a terminal including: a transceiver, a memory, a processor, and a program stored on the memory and executed by the processor, wherein the transceiver is configured to obtain first information, wherein the first information includes information reported by the terminal to a network side device or information received by the terminal from the network side device; the transceiver or the processor is configured to determine uplink transmission characteristic of the terminal, wherein the uplink transmission characteristic is an antenna panel for the uplink transmission determined by the terminal according to the first information, or the uplink transmission characteristic is determined by the terminal according to the first information and second information, and the second information includes panel relationship information of the terminal.

An embodiment of the present disclosure provides in the case that the uplink transmission characteristic is the antenna panel of uplink transmission determined by the terminal according to the first information: the information received by the terminal from the network side device includes a downlink signal, and the downlink signal is used to indicate uplink beam information used by the terminal or indicate information of the antenna panel for the uplink transmission; or, in the case that the uplink transmission characteristic is the antenna panel for uplink transmission determined by the terminal according to the first information: the information reported by the terminal to the network side device is used to report the antenna panel information for the uplink transmission; or, in the case that the uplink transmission characteristic is an uplink transmission characteristic determined by the terminal according to the first information and the second information: the panel relationship information includes: panel relationship information between uplink transmission and downlink reception of the terminal.

An embodiment of the present disclosure provides a terminal including: a transceiver, a memory, a processor, and a program stored on the memory and executed by the processor, the transceiver or processor is configured to obtain report information, wherein the report information includes information of an antenna panel of the terminal, and/or the report information is obtained based on the information of the antenna panel indicated by the network side device; the transceiver is configured to report the report information to the network side device.

Optionally, the report information is a measurement result, wherein the measurement result is measured by the terminal based on the indication information sent by the network side device; or, the report information is assistant information used to assist in determining the antenna panel of the terminal for uplink transmission.

An embodiment of the present disclosure provides a network side device, being a first network side device, including: a transceiver, a memory, a processor, and a program stored in the memory and executed by the processor, the transceiver or the processor is configured to determine uplink transmission characteristic of the terminal, wherein the uplink transmission characteristic is an antenna panel for the uplink transmission determined by the network side device according to the first information, or the uplink transmission characteristic is determined by the network side device according to the first information and second information, and the second information includes panel relationship information of the terminal; the first information includes information reported by the terminal to the network side device or information sent by the network side device to the terminal.

Optionally, in the case that the uplink transmission characteristic is the antenna panel of uplink transmission determined by the network side device according to the first information: the information sent by the network side device to the terminal includes a downlink signal, and the downlink signal is used to indicate uplink beam information used by the terminal or indicate information of the antenna panel for the uplink transmission; or, in the case that the uplink transmission characteristic is the antenna panel for uplink transmission determined by the network side device according to the first information: the information reported by the terminal to the network side device is used to report the antenna panel information for the uplink transmission; or, in the case that the uplink transmission characteristic is an uplink transmission characteristic determined by the terminal according to the first information and the second information: the panel relationship information includes: panel relationship information between uplink transmission and downlink reception of the terminal.

An embodiment of the present disclosure provides a network side device, being a first network side device, includes: a transceiver, a memory, a processor, and a program stored in the memory and executed by the processor, the transceiver is configured to receive report information reported by a terminal, wherein the report information includes information of an antenna panel of the terminal, and/or the report information is obtained based on the information of the antenna panel indicated by the network side device.

Optionally, the report information is a measurement result, wherein the measurement result is measured by the terminal based on the indication information sent by the network side device; or, the report information is assistant information used to assist in determining the antenna panel of the terminal for uplink transmission.

An embodiment of the present disclosure provides a computer-readable storage medium on which a computer program is stored, and the program is executed by a processor to implement the steps in the uplink transmission characteristics confirmation method or the steps in the information report method.

In this embodiment of the present disclosure, a terminal obtains first information, wherein the first information includes information reported by the terminal to a network side device or information received by the terminal from the network side device; Wherein the uplink transmission characteristics are the antenna panel of the terminal for uplink transmission determined according to the first information, or the uplink transmission characteristics are determined by the terminal according to the first information and the second information, and the second information includes the panel relationship information of the terminal. In this way, the network side device can obtain the first information related to the uplink transmission characteristic of the terminal, so that the network side device can obtain more terminal available information.

BRIEF DESCRIPTION OF THE DRAWINGS

FIG. 3 is a flowchart of an information report method provided by an embodiment of the present disclosure;

FIG. 4 is another flowchart of an uplink transmission characteristics conformation method provided by an embodiment of the present disclosure;

FIG. 5 is another flowchart of an information report method provided by an embodiment of the present disclosure;

DETAILED DESCRIPTION

In order to make the technical problems, technical solutions and advantages to be solved by the present disclosure more clear, detailed description will be given below with reference to the accompanying drawings and specific embodiments.

Figure 1:
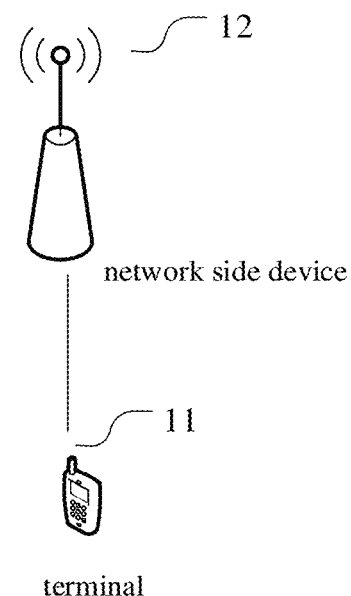
FIG. 1 is a schematic diagram of a network structure according to an embodiment of the present disclosure can be applied.

FIG. 1 is a schematic diagram of a network structure according to an embodiment of the present disclosure. As shown in FIG. 1, it includes a terminal 11 and a network side device 12. The terminal 11 may be a user equipment (UE) or other terminal equipment. For example: Mobile Phone, Tablet Personal Computer, Laptop Computer, Personal Digital Assistant (PDA), Mobile Internet Device (MID), Wearable Device, robots, vehicles and other terminal side devices. It should be noted that the specific types of terminals are not limited in the embodiments of the present disclosure. The network side device 12 may be a base station, such as a macro station, LTE eNB, 5G NR NB, etc.; the network side device may also be a small station, such as a low power node (LPN), pico, femto and other small stations, or the network side device may be an access point (AP); the network side device may also be a central unit (CU), or may be a network node such as a transmission reception point (TRP). It should be noted that, the embodiments of the present disclosure do not limit the specific type of the network side device.

Figure 2:
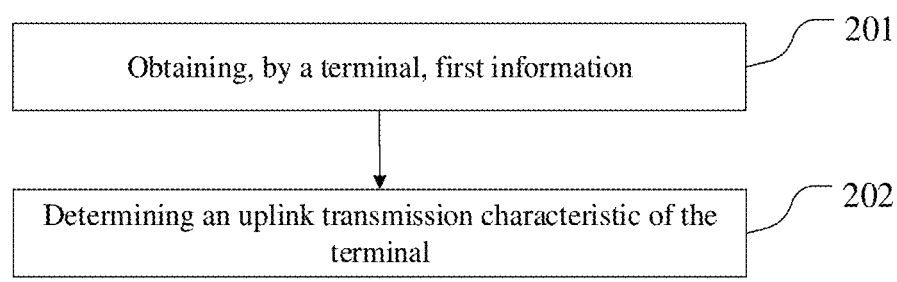
FIG. 2 is a flowchart of an uplink transmission characteristic confirmation method provided by an embodiment of the present disclosure.

FIG. 2 is a flowchart of an uplink transmission characteristic confirmation method provided by an embodiment of the present disclosure. As shown in FIG. 2, the method includes the following steps:

201. Obtaining, by a terminal, first information, wherein the first information includes information reported by the terminal to a network side device or information received by the terminal from the network side device;

202. Determining an uplink transmission characteristic of the terminal, wherein the uplink transmission characteristic is an antenna panel for the uplink transmission determined by the terminal according to the first information, or the uplink transmission characteristic is determined by the terminal according to the first information and second information, and the second information includes panel relationship information of the terminal.

The first information may be a downlink signal, or information reported by the terminal to the network side device.

The obtaining the first information by the terminal may be that the terminal receives information from the network side device, or may be that the terminal obtains information reported to the network side device.

The obtaining the uplink transmission characteristic of the terminal may be the antenna panel of uplink transmission determined according to the first information, or the uplink transmission characteristic determined according to the first information and the second information.

The panel relationship information may be information related to the antenna panel of the terminal for uplink transmission and downlink transmission.

In this embodiment of the present disclosure, the network side device can obtain the first information related to the uplink transmission characteristics of the terminal, so that the network side device can obtain more terminal available information. Further, the network side device may also determine the uplink transmission characteristic of the terminal, wherein the uplink transmission characteristic is the antenna panel for the uplink transmission determined by the network side device according to the first information, or the uplink transmission characteristic is the uplink transmission characteristic determined by the network side device according to the first information and the second information.

It should be noted that, in the case that the first information is received by the terminal from the network side device, since the first information is used to determine the uplink transmission characteristics of the terminal, it can also be understood that the network side device can obtain more terminal available information.

In addition, after obtaining the first information, the network side device can determine the uplink transmission characteristics of the terminal, so that the flexibility of the network side device in processing the terminal signal can be improved. Further, since the first information can be sent to the terminal by the network side device, the network side device can flexibly control the switching for the uplink transmission characteristics of the terminal, so as to improve the overall performance of the system.

As an optional implementation, in the case that the uplink transmission characteristic is the antenna panel of uplink transmission determined by the terminal according to the first information:

The information received by the terminal from the network side device includes a downlink signal, and the downlink signal is used to indicate uplink beam information used by the terminal or indicate antenna panel information for the uplink transmission.

In this embodiment, it is possible to determine the antenna panel for uplink transmission and determine the uplink beam information through the downlink signal. For example, the downlink signal may be associated with the antenna panel for the uplink transmission; or the uplink beam information may be associated with the antenna panel for the uplink transmission.

Wherein, the downlink signal is associated with panel information of the terminal, or, the uplink beam information is associated with the antenna panel for the uplink transmission, which may be an association indicated by the network side device through high layer signaling or physical layer signaling. For example, the association between the downlink signal and the antenna panel for the uplink transmission is configured by the network side for the terminal. For example, the network side device can indicate that the downlink signal is associated with the antenna panel for the uplink transmission through high layer signaling or physical layer signaling, such as at least one of radio resource control (RRC), medium access control-control unit (MAC-CE) or control signaling.

Optionally, associating the downlink signal with the antenna panel for uplink transmission includes:

Associating the downlink signal with antenna panel information of the antenna panel for uplink transmission.

Wherein, the antenna panel information may include but is not limited to the following items:

An identifier of the antenna panel for the uplink transmission;
An identifier of a sounding reference signal (SRS) resource for the uplink transmission;
An identifier of a SRS resource set for the uplink transmission;
An identifier of a SRS resource group for the uplink transmission.

Wherein, the SRS resource identifier, SRS resource set identifier and SRS resource group identifier may be related to the antenna panel of the terminal, for example, the antenna panel may be determined by the SRS resource identifier, the SRS resource set identifier or the SRS resource group identifier. In addition, the relationship between the SRS resource identifier, the SRS resource set identifier, and the SRS resource group identifier with the antenna panel of the terminal may be configured by the network side device to the terminal, or agreed in the protocol.

For the above downlink signal, an example is as follows:

Suppose the terminal has 2 panels that are panel-ID0 and panel-ID1. The base station side configures 8 downlink channel state indication reference signal (CSI-RS) resources for the terminal, which are CSI-RS resource 0, CSI-RS resource 1 . . . CSI-RS resource 7. At the same time, the base station side configures the associated panel-ID for each CSI-RS resource through RRC signaling, as shown in Table 1. The base station instructs the terminal to send PUCCH, and configures the spatial relationship information (SpatialRelationInfo) field of the PUCCH as CSI-RS resource 3, and instructs the terminal to use a receiving beam direction for receiving the CSI-RS resource 3 through downlink signals, so as to send the PUCCH signal.

When the terminal receives the SpatialRelationInfo field configured by the base station that is CSI-RS resource 3, and the CSI-RS resource 3 configured by the base station is associated with panel-ID0, the terminal can determine to use panel-ID0 to send the PUCCH signal.

TABLE 1

| RRC configures that the CSI-RS resources are associated with panels ||
|---|---|
| CSI-RS resource | Associated panel |
| CSI-RS resource 0 | panel-ID0 |
| CSI-RS resource 1 | panel-ID0 |
| CSI-RS resource 2 | panel-ID0 |
| CSI-RS resource 3 | panel-ID0 |
| CSI-RS resource 4 | panel-ID1 |
| CSI-RS resource 5 | panel-ID1 |
| CSI-RS resource 6 | panel-ID1 |
| CSI-RS resource 7 | panel-ID1 |

As an optional implementation, in the case that the uplink transmission characteristic is the antenna panel of uplink transmission determined by the terminal according to the first information:

The information reported by the terminal to the network side device is used to report the antenna panel information for the uplink transmission.

For the antenna panel information may refer to the above antenna panel information, which is not repeated here.

In this embodiment, since the terminal reports the antenna panel information, the terminal and the network side device determine the antenna panel according to the antenna panel information.

Optionally, the information reported by the terminal to the network side device is: information reported by the terminal most recently before determining the antenna panel for uplink transmission.

The information reported by the terminal most recently is the antenna panel information.

In this embodiment, the terminal may report the antenna panel information periodically or in the form of event triggering.

Optionally, the information reported by the terminal to the network side device includes:

Information reported by the terminal according to a measurement result of a downlink reference signal of the network side device, and the information includes reference signal resource indication information and the antenna panel information for the uplink transmission.

In this embodiment, since the reference signal resource indication information and the antenna panel information for the uplink transmission can be reported, the network side device can flexibly determine the antenna panel for the uplink transmission of the terminal.

It should be noted that the reference signal resource indication information may also be a kind of antenna panel information, and in some embodiments, only reference signal resource indication information, such as the CSI-RS resource indication, may be reported.

Suppose the terminal has 2 panels, panel-ID0 and panel-ID1. The system predefines the antenna panel for uplink transmission determined according to the antenna panel information carried in the latest CRI report.

In the case that the uplink transmission characteristic is the antenna panel for uplink transmission determined by the terminal according to the first information, one example is as follows:

The base station configures 8 downlink CSI-RS resources for the terminal, which are CSI-RS resource 0, CSI-RS resource 1 . . . CSI-RS resource 7. The base station configures the terminal to measure the 8 downlink CSI-RS resources, and periodically report CRI information, and each CRI information carries panel-ID information.

In one report, the terminal can determine an optimal CSI-RS resource and the information of the panel received by the terminal. For example, according to multiple reference signal receiving power (RSRP) values measured by different panels receiving different CSI-RS resources, it is determined that panel-ID0 receives the CSI-RS resource 5 with the largest RSRP value. In this way, the terminal can report the information of CRI5 and panel-ID0 to the base station, indicating that the optimal reception can be obtained by using panel-ID0 to receive CSI-RS resource 5. The base station receives the current CSI-RS resource indicator (CRI) report. If the base station configures the terminal to send the PUCCH before the next CRI report, the terminal uses the panel-ID0 in the current CRI report to transmit the PUCCH according to the system pre-definition.

Certainly, the uplink transmission characteristic of the terminal may also be determined according to the system pre-definition, for example, the antenna panel for uplink transmission is determined according to the system pre-definition.

As an optional implementation, when the uplink transmission characteristic is determined by the terminal according to the first information and the second information:

The panel relationship information includes:

Panel relationship information between uplink transmission and downlink reception of the terminal.

The panel relationship information may be predefined, configured by the network side for the terminal, or reported by the terminal to the network side. For example, the network side device is configured to the terminal through high layer signaling or physical layer signaling, for example, including at least one of RRC, MAC-CE or control signaling.

The first information may be a downlink signal, and further, the downlink signal may be used to determine a downlink reference signal for the uplink transmission beam direction. Or the first information is the antenna panel information indicated by the network side device. The first information may be used to trigger the determination for the uplink transmission characteristics of the terminal, or to indicate the antenna panel of the terminal for the uplink transmission, or the like.

Optionally, the panel relationship information between uplink transmission and downlink transmission of the terminal, including:

The relationship information between the antenna panel information for the uplink transmission and the antenna panel information for downlink reception of the terminal; or The relationship information between transmission characteristic information of the panel of the terminal for uplink transmission and the reception characteristic information of the panel of the terminal for downlink reception.

Wherein, the antenna panel information may include but is not limited to the following items:

An identifier of the antenna panel for the uplink transmission;

An identifier of an SRS resource for the uplink transmission;

An identifier of an SRS resource set for the uplink transmission;

An identifier of an SRS resource group for the uplink transmission.

The transmission characteristic information may include, but is not limited to, at least one of the following:

A spatial filter for uplink transmission, a transmission beam for uplink transmission, a power control for uplink transmission, a timing for uplink transmission and Doppler information for uplink transmission;

and/or,

The reception characteristic information may include, but is not limited to, at least one of the following:

A spatial filter of downlink transmission, a transmission beam for downlink transmission, a path loss for downlink transmission, a timing for downlink transmission and Doppler information for downlink transmission.

Further, the relationship information between the antenna panel information for the uplink transmission and the antenna panel information for the downlink reception of the terminal may indicate that the antenna panel information for the uplink transmission is the same as the antenna panel information for the downlink reception, the antenna panel information for the uplink transmission is different from the antenna panel information for the downlink reception, or the specific difference between the antenna panel information for the uplink transmission and the antenna panel information for the downlink reception, such as an offset of the antenna panel identifier.

The relationship information between the transmission characteristic information of the panel of the above-mentioned terminal for uplink transmission and the reception characteristic information of the panel of the terminal or downlink reception may be that the transmission characteristic information of the panel of the terminal for uplink transmission is the same as, or different from the reception characteristic information of the panel of the terminal downlink reception, or it may also be the relative relationship between the transmission feature information of the panel of the terminal for uplink transmission and the reception feature information of the panel of the terminal for the downlink reception, and so on.

As an optional implementation, when the uplink transmission characteristic is determined by the terminal according to the first information and the second information:

The uplink transmission characteristics include at least one of the following:

An antenna panel for uplink transmission, a spatial filter for uplink transmission, a transmission beam for uplink transmission, a power control for uplink transmission, a timing for uplink transmission and a Doppler pre-compensation for uplink transmission.

Further, the method may also include:

Reporting, by the terminal, the uplink transmission characteristic to the network side device.

In this embodiment, the uplink transmission characteristics may be determined according to the first information and the second information, and further, the network side device also determines the uplink transmission characteristics according to the first information and second information, so that the terminal side and the network side have the same understanding for the uplink transmission characteristics of the terminal.

When the uplink transmission characteristic is determined by the terminal according to the first information and the second information:

An example is as follows:

Suppose the terminal has 2 panels, panel-ID0 and panel-ID1. The base station configures a set of path loss reference signals (maximum 4) for PUSCH power control, as shown below. The PUSCH-PathlossReferenceRS is a path loss reference signal configured by the base station.

```
PUSCH-PathlossReferenceRS ::=        SEQUENCE {
   pusch-PathlossReferenceRS-Id         PUSCH-PathlossReferenceRS-
Id,
   referenceSignal                   CHOICE {
      ssb-Index                         SSB-Index,
      csi-RS-Index                      NZP-CSI-RS-ResourceId
   }
}
SRI-PUSCH-PowerControl ::=           SEQUENCE {
   sri-PUSCH-PowerControlId             SRI-PUSCH-PowerControlId,
   sri-PUSCH-PathlossReferenceRS-Id     PUSCH-PathlossReferenceRS-
Id,
   sri-P0-PUSCH-AlphaSetId              P0-PUSCH-AlphaSetId,
   sri-PUSCH-ClosedLoopIndex            ENUMERATED { i0, i1 }
}
```

The base station associates one panel-ID with each path loss parameter in the power control configuration of the PUSCH through RRC signaling. For example, the base station configures 4 PUSCH-PathlossReferenceRSs for PUSCH power control through RRC signaling, and configures the association between the base station and the panel of the terminal as follows:

TABLE 2

RRC configures that the path loss reference signal is associated with panel

| Path Loss Reference Signal | Associated Panel |
| --- | --- |
| PUSCH-PathlossReferenceRS0 | panel-ID0 |
| PUSCH-PathlossReferenceRS1 | panel-ID0 |
| PUSCH-PathlossReferenceRS2 | panel-ID1 |
| PUSCH-PathlossReferenceRS3 | panel-ID1 |

The base station instructs the terminal to use panel-ID0 for PUSCH transmission through physical layer downlink control information (DCI) signaling. Then, the terminal selects one of PUSCH-PathlossReferenceRS0 and PUSCH-PathlossReferenceRS1 to determine the uplink power for transmitting PUSCH in panel-ID0.

An example is as follows:

Suppose the terminal has 2 panels, panel-ID0 and panel-ID1. The system pre-defines that the antenna panel of the terminal for receiving downlink CSI-RS is the same as the antenna panel of the terminal for transmitting PUSCH/PUCCH. The base station side configures 8 downlink CSI-RS resources for the terminal, and each resource has a different transmission beam direction, which is represented as CSI-RS resource 0, CSI-RS resource 1, . . . , CSI-RS resource 7. After the downlink beam scanning process, the terminal can determine the optimal receiving panel for each CSI-RS resource. For example, CSI-RS resource 0 to CSI-RS resource 4 are all using panel-ID0 for reception, and CSI-RS resource 5 to CSI-RS resource 7 are all using panel-ID1 for reception. The base station instructs the terminal to send the PUCCH, and configures the SpatialRelationInfo field of the PUCCH as CSI-RS resource 3, indicates the beam direction of the terminal for sending the PUCCH signal. Then, according to the system pre-definition, the terminal will select panel-ID0 for transmitting the PUCCH signal.

An example is as follows:

Suppose the terminal has 2 panels, panel-ID0 and panel-ID1. System predefines that the antenna panel of the terminal for receiving the downlink path loss reference signal is the same as the antenna panel of the terminal for sending the PUSCH. The base station configures 8 downlink CSI-RS resources for the terminal, and each resource has a different transmission beam direction, which is represented as CSI-RS resource 0, CSI-RS resource 1, . . . , CSI-RS resource 7. After the downlink beam scanning process, the terminal can determine the optimal receiving panel for each CSI-RS resource. For example, CSI-RS resource 0 to CSI-RS resource 4 are all using panel-ID0 for reception, and CSI-RS resource 5 to CSI-RS resource 7 are all using panel-ID1 for reception. The base station configures a path loss reference signal for the terminal to perform PUSCH transmission, and this signal is configured through high-layer signaling PUSCH-PathlossReferenceRS, as shown in Table 2. The base station instructs to select the path reference signal PUSCH-PathlossReferenceRS1 through physical layer DCI signaling. The terminal will select panel-ID0 for transmitting the PUSCH signal according to the system pre-definition.

TABLE 3

RRC configures Path Loss Reference Signal

| Path Loss Reference Signal | Downlink Reference Signal |
| --- | --- |
| PUSCH-PathlossReferenceRS0 | CSI-RS0 |
| PUSCH-PathlossReferenceRS1 | CSI-RS3 |
| PUSCH-PathlossReferenceRS2 | CSI-RS4 |
| PUSCH-PathlossReferenceRS3 | CSI-RS7 |

Further, after determining the uplink transmission characteristics, the terminal may perform uplink transmission according to the uplink transmission characteristics.

In this embodiment of the present disclosure, a terminal obtains first information, wherein the first information includes information reported by the terminal to a network side device or information received by the terminal from the network side device; Wherein the uplink transmission characteristics are the antenna panel of the terminal for uplink transmission determined according to the first information, or the uplink transmission characteristics are determined by the terminal according to the first information and the second information, and the second information includes the panel relationship information of the terminal. In this way, the network side device can obtain the first information related to the uplink transmission characteristic of the terminal, so that the network side device can obtain more terminal available information.

FIG. 3 is a flowchart of an information report method provided by an embodiment of the present disclosure. As shown in FIG. 3, the following steps are included:

301. Obtaining, by a terminal, report information, wherein the report information includes information of an antenna panel of the terminal, and/or the report information is obtained based on the information of the antenna panel indicated by the network side device;

302. Reporting, by the terminal, the report information to the network side device.

Wherein, the report information includes the information of the antenna panel of the terminal, and/or the report information is obtained based on the information of the antenna panel indicated by the network side device, and may be:

The report information includes information of the antenna panel of the terminal; or, The report information is obtained based on the information of the antenna panel indicated by the network side device; or The report information includes the information of the antenna panel of the terminal, and the report information is obtained based on the information of the antenna panel indicated by the network side device.

The report information includes the information of the antenna panel of the terminal may be that the report information includes the information of the antenna panel or the report information includes assistant information for assisting in determining the antenna panel, and the like.

In this embodiment of the present disclosure, the above-mentioned steps can be used to report the report information to the network side device, so that the network side device can obtain more terminal available information, so as to improve the processing performance of the network side device.

As an optional implementation, the report information is a measurement result, wherein the measurement result is measured by the terminal based on the indication information sent by the network side device.

Wherein, in the case that the report information is obtained based on the information of the antenna panel indicated by the network side device: the information of the antenna panel indicated by the network side device may be the information of the antenna panel of the terminal included in the indication information; or In the case that the report information includes the information of the antenna panel of the terminal: the information of the antenna panel of the terminal may be the information of the antenna panel of the terminal included in the measurement result; or In the case that the report information includes information of the antenna panel of the terminal, and the report information is obtained based on the information of the antenna panel indicated by the network side device: the information of the antenna panel indicated by the network side device may be the information of the antenna panel of the terminal included in the indication information, and the information of the antenna panel of the terminal may be the information of the antenna panel of the terminal included in the measurement result.

For example, the network side device sends indication information to the terminal to instruct the terminal to measure path loss or reference signal, etc., and then the network side device receives the measurement result reported by the terminal.

Wherein, the indication information may be high layer signaling or physical layer signaling.

The measurement result includes the information of the antenna panel of the terminal, which may be the information of the antenna panel used by the terminal for measurement. For example, the information of the antenna panel may be the information of the antenna panel used by the terminal for path loss measurement.

The antenna panel information may include but is not limited to the following:

An identifier of the antenna panel for measurement;

An identifier of a sounding reference signal (SRS) resource of the antenna panel for measurement;

An identifier of a SRS resource set of the antenna panel for measurement;

An identifier of a SRS resource group of the antenna panel for measurement.

The identifier of the SRS resource of the antenna panel can be the identifier of the SRS resource sent on the antenna panel, the identifier of the SRS resource set of the antenna panel can be the identifier of the SRS resource set sent on the antenna panel, the identifier of the SRS resource group of the antenna panel may be the identifier of the SRS resource group sent on the antenna panel. The identifier of the SRS resource of the antenna panel may be the identifier of the SRS resource of the SRS sent on the antenna panel, and the identifier of the SRS resource set of the antenna panel may be the identifier of the SRS resource set of the SRS sent on the antenna panel, the identifier of the SRS resource group of the antenna panel may be the identifier of the SRS resource group of the SRS sent on the antenna panel.

In this embodiment, in measurement (e.g., path loss measurement), the network side device configures the receiving antenna panel information of the terminal or the antenna panel information for measurement, or the terminal reports the antenna panel information used by the terminal.

An example is as follows:

Suppose the terminal has 2 panels, panel-ID0 and panel-ID1. The base station configures four downlink CSI-RS resources for the terminal of the measurement of the path loss by the terminal, which are CSI-RS resource 0, CSI-RS resource 1 . . . CSI-RS resource 3. The base station instructs the terminal to use CSI-RS resource 1 to perform path loss measurement through an SRS resource indicator (SRI) in the DCI signaling. Meanwhile, one panel-ID indication field is included in the DCI signaling. For example, a bit '0' is used to indicate that the panel-ID0 is used to receive the CSI-RS resource 1 for path loss measurement. After receiving the DCI signaling, the terminal uses panel-ID0 to receive CSI-RS resource 1 to measure path loss. Power Head Room (PHR) is calculated according to the measured path loss, and report the same to the base station.

An example is as follows:

Suppose the terminal has 2 panels, panel-ID0 and panel-ID1. The base station configures four downlink CSI-RS resources for the terminal to measure the path loss, which are CSI-RS resource 0, CSI-RS resource 1 . . . CSI-RS resource 3. The base station instructs the terminal to use the CSI-RS resource 1 to measure the path loss through the SRI in the DCI signaling. After receiving the DCI signaling, the terminal automatically determines a panel for receiving CSI-RS resource 1 according to the received signal strengths of different panels. For example, the terminal determines to use panel-ID1 to receive CSI-RS resource 1 to measure path loss. PHR is calculated based on the measured path loss. When the terminal reports the PHR information, the terminal reports the information of panel-ID1 to the base station to inform the base station that the PHR is calculated through the CSI-RS received by panel-ID1.

An example is as follows:

Suppose the terminal has 2 panels, panel-ID0 and panel-ID1. The base station configures four downlink CSI-RS resources for the terminal to measure the path loss, which are CSI-RS resource 0, CSI-RS resource 1 . . . CSI-RS resource 3. The base station instructs the terminal to use the CSI-RS resource 1 to measure the path loss through the SRI in the DCI signaling. Meanwhile, one panel-ID indication field is included in this DCI signaling. For example, a bit '0' is used to indicate that the panel-ID0 is used to receive the CSI-RS resource 1 for path loss measurement. After receiving the DCI signaling, the terminal calculates the received signal strengths of different panels, and determines that using panel-ID1 to receive CSI-RS resource 1 has better received signal strengths. In this way, the terminal determines to use panel-ID1 to measure the path loss, and calculates the power head room (PHR) according to the measured path loss. When the terminal reports the PHR information, the terminal reports the information of panel-ID1 to the base station to inform the base station that the PHR is calculated through the CSI-RS received by panel-ID1.

As an optional implementation, in the case that the report information includes information about of antenna panel of the terminal: the report information is assistant information used to assist in determining the antenna panel of the terminal for uplink transmission.

That is, the information is the assistant information.

In this embodiment, the assistant information is used to assist the network side device to select an antenna panel for uplink transmission.

Optionally, the report information includes at least one of the following:

a number of antenna panels of the terminal, an activation time of the antenna panels, and a number of ports of the antenna panels.

The number of antenna panels, the activation time of the antenna panels, and the number of ports of the antenna panels may be the number, activation time, and number of ports of the antenna panels of the terminal for uplink transmission.

Further, the antenna panel associated with the report information is an antenna panel that can be activated and used for uplink transmission.

The antenna panels associated with the report information may be the antenna panels corresponding to the report information, for example, the content in the report information is information of antenna panels that can be activated and used for uplink transmission.

Optionally, the report information is used to explicitly report the information of the antenna panel of the terminal, or the report information is implicitly reported as the capability of the terminal.

The explicit reporting the information of the antenna panel of the terminal may be to report the information of the antenna panel of the terminal to the network side device through dedicated signaling. Of course, this is not limited, and the information of the antenna panel of the terminal can also be explicitly reported through other uplink signaling.

Further, the explicitly reported information may include an identifier of the antenna panel (panel-ID) of the terminal.

The report information as the capability of the terminal can be implicitly reported by using the content in report information as the capability of the terminal, and the report information is reported through the process of reporting the terminal capability to save transmission overhead.

Optionally, the method further includes:

Receiving, by the terminal, configuration information sent by the network side device, wherein the configuration information is used for the information of the antenna panel of the terminal for the uplink transmission.

The configuration information may be configured by the network side device through high-layer signaling or physical layer signaling, for example, configuration information configured through at least one of RRC, MAC-CE, or control signaling.

Further, the configuration information may include the information of the antenna panel, such as an SRS identifier or an SRS resource identifier or an antenna panel identifier.

In addition, the configuration information may be determined by the network side device according to the report information, so that the control of the antenna panel of the terminal for uplink transmission can be more accurate and flexible.

Optionally, the method further includes:

Determining by the terminal, the antenna panel for the uplink transmission according to the configuration information.

The determining the antenna panel for uplink transmission according to the configuration information may be determining the antenna panel corresponding to the configuration information as the antenna panel for uplink transmission, that is, associating the antenna panel with uplink transmission.

An example is as follows:

Suppose the terminal has 2 panels, panel-ID0 and panel-ID1. The terminal reports the panel number N=2 to the base station. The base station determines to configure two SRS resource sets for the terminal according to the value of N. The first resource set includes SRS resource 0, SRS resource 1, and SRS resource 2. The second resource set includes SRS resource 3, SRS resource 4, and SRS resource 5. At the same time, the base station configures an associated panel-ID for each SRS resource set through RRC signaling, as shown in Table 1.

TABLE 4

| RRC configures the SRS resource to be associated with panel | | |
|---|---|---|
| SRS resource set | SRS resource | Associated panel |
| SRS resource set 0 | SRS resource 0 | panel-ID0 |
|  | SRS resource 1 | panel-ID0 |
|  | SRS resource 2 | panel-ID0 |
| SRS resource set 1 | SRS resource 3 | panel-ID1 |
|  | SRS resource 4 | panel-ID1 |
|  | SRS resource 5 | Panel-ID1 |

The base station instructs the terminal to send the PUCCH, and configures the SpatialRelationInfo field of the PUCCH as SRS resource 3, instructs the terminal to use the transmission beam direction for transmitting the SRS resource 3 to transmit the PUCCH signal. When the terminal receives that the SpatialRelationInfo field configured by the base station is SRS resource 3, and receives that the base station configures SRS resource 3 to be associated with panel-ID1, the terminal can determine to use panel-ID1 to send the PUCCH signal.

An example is as follows:

Suppose the terminal has 2 panels, panel-ID0 and panel-ID1. The terminal reports the panel number N=2 to the base station. The base station determines to configure two SRS resource sets for the terminal according to the value of N, and the first resource set includes SRS resource 0, SRS resource 1, and SRS resource 2. The second resource set includes SRS resource 3, SRS resource 4, and SRS resource 5. At the same time, the base station configures the associated panel-ID for each SRS resource set through RRC signaling, as shown in Table 4. The terminal reports the panel activation time m.

The base station instructs the terminal to transmit the PUSCH in the time slot n, and the transmission beam configured with the PUSCH is indicated by the SpatialRelationInfo of the SRS resource 3 on the panel-ID1. For the same terminal, in time slot n+m, the base station instructs the terminal to send PUSCH and the configured PUSCH transmission beam is indicated by the SpatialRelationInfo of the SRS resources (SRS resource 3, SRS resource 4, SRS resource 5) on the same panel-ID of time slot n.

In the embodiment of the present disclosure, the terminal obtains the report information; the terminal reports the report information to the network side device. In this way, the network side device can obtain more terminal available information.

FIG. 4 is another flowchart of an uplink transmission characteristics conformation method provided by an embodiment of the present disclosure. As shown in FIG. 4, the method includes the following steps:

401. Determining, by a network side device, the uplink transmission characteristic of the terminal, wherein the uplink transmission characteristic is an antenna panel for the uplink transmission determined by the network side device according to the first information, or the uplink transmission characteristic is determined by the network side device according to the first information and second information, and the second information includes panel relationship information of the terminal;

The first information includes information reported by the terminal to the network side device or information sent by the network side device to the terminal.

Optionally, in the case that the uplink transmission characteristic is the antenna panel of uplink transmission determined by the network side device according to the first information:

The information sent by the network side device to the terminal includes a downlink signal, and the downlink signal is used to indicate uplink beam information used by the terminal or indicate information of the antenna panel for the uplink transmission.

Optionally, the downlink signal is associated with the antenna panel for the uplink transmission; or The uplink beam information is associated with the antenna panel for the uplink transmission.

Optionally, associating the downlink signal with the antenna panel for uplink transmission includes:

Associating the downlink signal with antenna panel information of the antenna panel for uplink transmission.

Wherein, the antenna panel information may include but is not limited to the following items:

An identifier of the antenna panel for the uplink transmission;

An identifier of a sounding reference signal (SRS) resource for the uplink transmission;

An identifier of a SRS resource set for the uplink transmission;

An identifier of a SRS resource group for the uplink transmission.

Optionally, the associating the downlink signal with the antenna panel for the uplink transmission is configured by the network side to the terminal.

Optionally, in the case that the uplink transmission characteristic is the antenna panel for uplink transmission determined by the network side device according to the first information:

The information reported by the terminal to the network side device is used to report the antenna panel information for the uplink transmission.

Optionally, the information reported by the terminal to the network side device is: information reported by the terminal most recently before determining the antenna panel for uplink transmission.

Optionally, the information reported by the terminal to the network side device includes:

Information reported by the terminal according to the measurement result of the downlink reference signal of the network side device, and the report information includes reference signal resource indication information and the antenna panel information for the uplink transmission.

Optionally, in the case that the uplink transmission characteristic is an uplink transmission characteristic determined by the terminal according to the first information and the second information:

The panel relationship information includes:

Panel relationship information between uplink transmission and downlink reception of the terminal.

Optionally, the panel relationship information between uplink transmission and downlink transmission of the terminal, including:

The relationship information between the antenna panel information for the uplink transmission and the antenna panel information for downlink reception of the terminal; or The relationship information between transmission characteristic information of the panel of the terminal for uplink transmission and the reception characteristic information of the panel of the terminal for downlink reception.

Optionally, the antenna panel information may include the following:

An identifier of the antenna panel for the uplink transmission;

An identifier of an SRS resource for the uplink transmission;

An identifier of an SRS resource set for the uplink transmission;

An identifier of an SRS resource group for the uplink transmission.

The transmission characteristic information may include, but is not limited to, at least one of the following:

A spatial filter for uplink transmission, a transmission beam for uplink transmission, a power control for uplink transmission, a timing for uplink transmission and Doppler information for uplink transmission; and/or, The reception characteristic information may include, but is not limited to, at least one of the following:

A spatial filter of downlink transmission, a transmission beam for downlink transmission, a path loss for downlink transmission, a timing for downlink transmission and Doppler information for downlink transmission.

Optionally, the panel relationship information is predefined, configured by the network side to the terminal, or reported by the terminal to the network side.

Optionally, in the case that the uplink transmission characteristic is an uplink transmission characteristic determined by the terminal according to the first information and the second information:

The uplink transmission characteristics include at least one of the following:

An antenna panel for uplink transmission, a spatial filter for uplink transmission, a transmission beam for uplink transmission, a power control for uplink transmission, a timing for uplink transmission and a Doppler pre-compensation for uplink transmission.

Optionally, the method further includes:

Receiving, by the network side device, the uplink transmission characteristic reported by the terminal.

It should be noted that this embodiment is an implementation of the network side device corresponding to the embodiment shown in FIG. 2, and reference may be made to the relevant description of the embodiment shown in FIG. 2 for the specific implementation. In order to avoid repeated descriptions, the present embodiment will not be repeated, and the same beneficial effects can also be achieved.

FIG. 5 is another flowchart of an information report method provided by an embodiment of the present disclosure. As shown in FIG. 5, the following steps are included:

501. Receiving, by a network side device, report information reported by a terminal, wherein the report information includes information of an antenna panel of the terminal, and/or the report information is obtained based on the information of the antenna panel indicated by the network side device;

Optionally, the report information is a measurement result, wherein the measurement result is measured by the terminal based on the indication information sent by the network side device.

Optionally, in the case that the report information is obtained based on the information of the antenna panel indicated by the network side device: the information of the antenna panel indicated by the network side device may be the information of the antenna panel of the terminal included in the indication information; or In the case that the report information includes the information of the antenna panel of the terminal: the information of the antenna panel of the terminal may be the information of the antenna panel of the terminal included in the measurement result; or In the case that the report information includes information of the antenna panel of the terminal, and the report information is obtained based on the information of the antenna panel indicated by the network side device: the information of the antenna panel indicated by the network side device may be the information of the antenna panel of the terminal included in the indication information, and the information of the antenna panel of the terminal may be the information of the antenna panel of the terminal included in the measurement result.

Optionally, the antenna panel information may include but is not limited to the following items:

An identifier of the antenna panel for the uplink transmission;
An identifier of a sounding reference signal (SRS) resource for the uplink transmission;
An identifier of a SRS resource set for the uplink transmission;
An identifier of a SRS resource group for the uplink transmission.

Optionally, in the case that the report information includes information of the antenna panel of the terminal: the report information is assistant information used to assist in determining the antenna panel of the terminal for uplink transmission.

Optionally, the report information includes at least one of the following:

a number of antenna panels of the terminal, an activation time of the antenna panels, and a number of ports of the antenna panels.

Optionally, the antenna panel associated with the report information is an antenna panel that can be activated and used for uplink transmission.

Optionally, the report information is used to explicitly report the antenna panel information of the terminal, or the report information is implicitly reported as the capability of the terminal.

Optionally, the method further includes:

Sending, by the network side device, configuration information to the terminal, wherein the configuration information is used for antenna panel information of the terminal for uplink transmission.

It should be noted that this embodiment is an implementation of the network side device corresponding to the embodiment shown in FIG. 3, and reference may be made to the relevant description of the embodiment shown in FIG. 3 for the specific implementation. In order to avoid repeated descriptions, the present embodiment will not be repeated, and the same beneficial effects can also be achieved.

Figure 6:
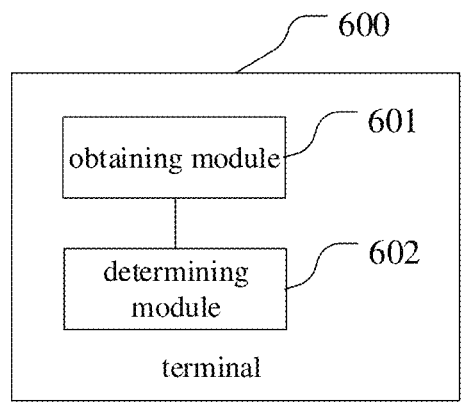
FIG. 6 is a structural diagram of a terminal provided by an embodiment of the present disclosure.

FIG. 6 is a structural diagram of a terminal provided by an embodiment of the present disclosure. As shown in FIG. 6, the terminal 600 includes:

an obtaining module 601, configured to obtain first information, wherein the first information includes information reported by the terminal to a network side device or information received by the terminal from the network side device;

a determining module 602, configured to determine uplink transmission characteristic of the terminal, wherein the uplink transmission characteristic is an antenna panel for the uplink transmission determined by the terminal according to the first information, or the uplink transmission characteristic is determined by the terminal according to the first information and second information, and the second information includes panel relationship information of the terminal;

Optionally, in the case that the uplink transmission characteristic is the antenna panel of uplink transmission determined by the terminal according to the first information:

The information received by the terminal from the network side device includes a downlink signal, and the downlink signal is used to indicate uplink beam information used by the terminal or indicate information of the antenna panel for the uplink transmission.

Optionally, the downlink signal is associated with the antenna panel for the uplink transmission; or The uplink beam information is associated with the antenna panel for the uplink transmission.

Optionally, associating the downlink signal with the antenna panel for uplink transmission includes:

Associating the downlink signal with antenna panel information of the antenna panel for uplink transmission.

Wherein, the antenna panel information may include but is not limited to the following items:

An identifier of the antenna panel for the uplink transmission;

An identifier of a sounding reference signal (SRS) resource for the uplink transmission;

An identifier of a SRS resource set for the uplink transmission;

An identifier of a SRS resource group for the uplink transmission.

Optionally, the associating the downlink signal with the antenna panel for the uplink transmission is configured by the network side to the terminal.

Optionally, in the case that the uplink transmission characteristic is the antenna panel for uplink transmission determined by the terminal according to the first information:

The information reported by the terminal to the network side device is used to report the antenna panel information for the uplink transmission.

Optionally, the information reported by the terminal to the network side device is: information reported by the terminal most recently before determining the antenna panel for uplink transmission.

Optionally, the information reported by the terminal to the network side device includes:

Information reported by the terminal according to the measurement result of the downlink reference signal of the network side device, and the report information includes reference signal resource indication information and the antenna panel information for the uplink transmission.

Optionally, in the case that the uplink transmission characteristic is an uplink transmission characteristic determined by the terminal according to the first information and the second information:

The panel relationship information includes:

Panel relationship information between uplink transmission and downlink reception of the terminal.

Optionally, the panel relationship information between uplink transmission and downlink transmission of the terminal, including:

The relationship information between the antenna panel information for the uplink transmission and the antenna panel information for downlink reception of the terminal; or The relationship information between transmission characteristic information of the panel of the terminal for uplink transmission and the reception characteristic information of the panel of the terminal for downlink reception.

Optionally, the antenna panel information may include the following:

An identifier of the antenna panel for the uplink transmission;

An identifier of an SRS resource for the uplink transmission;

An identifier of an SRS resource set for the uplink transmission;

An identifier of an SRS resource group for the uplink transmission.

The transmission characteristic information may include, but is not limited to, at least one of the following:

A spatial filter for uplink transmission, a transmission beam for uplink transmission, a power control for uplink transmission, a timing for uplink transmission and Doppler information for uplink transmission;

and/or,

The reception characteristic information may include, but is not limited to, at least one of the following:

A spatial filter of downlink transmission, a transmission beam for downlink transmission, a path loss for downlink transmission, a timing for downlink transmission and Doppler information for downlink transmission.

Optionally, the panel relationship information is predefined, configured by the network side to the terminal, or reported by the terminal to the network side.

Optionally, in the case that the uplink transmission characteristic is an uplink transmission characteristic determined by the terminal according to the first information and the second information:

The uplink transmission characteristics include at least one of the following:

An antenna panel for uplink transmission, a spatial filter for uplink transmission, a transmission beam for uplink transmission, a power control for uplink transmission, a timing for uplink transmission and a Doppler pre-compensation for uplink transmission.

Optionally, the method further includes:

Receiving, by the network side device, the uplink transmission characteristic reported by the terminal.

Figure 7:
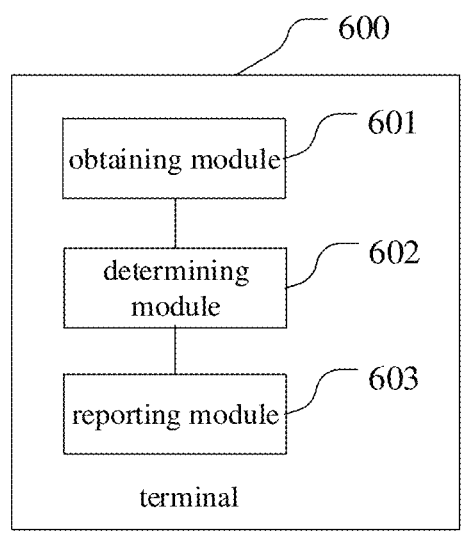
FIG. 7 is another structural diagram of a terminal provided by an embodiment of the present disclosure.

Optionally, as shown in FIG. 7, the device further includes:

a reporting module 603, configured to report the uplink transmission characteristic to the network side device.

It should be noted that the above-mentioned terminal 600 in this embodiment may be a terminal of any implementation in the method embodiment shown in FIG. 2, and any implementation of the terminal in the method embodiment shown in FIG. 2 can be implemented by the above-mentioned terminal 600 in this embodiment, and achieve the same beneficial effects, which will not be repeated here.

Figure 8:
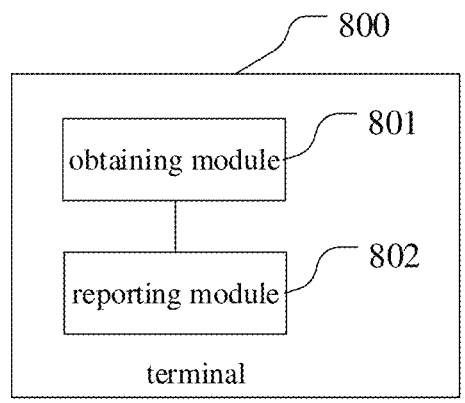
FIG. 8 is still another structural diagram of a terminal provided by an embodiment of the present disclosure.

FIG. 8 is a structural diagram of a terminal provided by an embodiment of the present disclosure. As shown in FIG. 8, the terminal 800 includes:

An obtaining module 801, configured to obtain report information, wherein the report information includes information of an antenna panel of the terminal, and/or the report information is obtained based on the information of the antenna panel indicated by the network side device;

a reporting module 802, configured to report the report information to the network side device.

Optionally, the report information is a measurement result, wherein the measurement result is measured by the terminal based on the indication information sent by the network side device.

Optionally, in the case that the report information is obtained based on the information of the antenna panel indicated by the network side device: the information of the antenna panel indicated by the network side device may be the information of the antenna panel of the terminal included in the indication information; or In the case that the report information includes the information of the antenna panel of the terminal: the information of the antenna panel of the terminal may be the information of the antenna panel of the terminal included in the measurement result; or In the case that the report information includes information of the antenna panel of the terminal, and the report information is obtained based on the information of the antenna panel indicated by the network side device: the information of the antenna panel indicated by the network side device may be the information of the antenna panel of the terminal included in the indication information, and the information of the antenna panel of the terminal may be the information of the antenna panel of the terminal included in the measurement result.

Optionally, the antenna panel information may include but is not limited to the following items:

An identifier of the antenna panel for measurement;
An identifier of a sounding reference signal (SRS) resource for measurement;
An identifier of a SRS resource set for measurement;
An identifier of a SRS resource group for measurement.

Optionally, in the case that the report information includes information of the antenna panel of the terminal: the report information is assistant information used to assist in determining the antenna panel of the terminal for uplink transmission.

Optionally, the report information includes at least one of the following:

a number of antenna panels of the terminal, an activation time of the antenna panels, and a number of ports of the antenna panels.

Optionally, the antenna panel associated with the report information is an antenna panel that can be activated and used for uplink transmission.

Optionally, the report information is used to explicitly report the antenna panel information of the terminal, or the report information is implicitly reported as the capability of the terminal.

Figure 9:
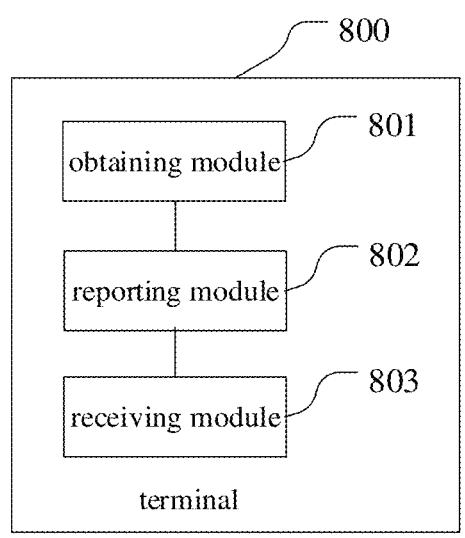
FIG. 9 is still yet another structural diagram of a terminal provided by an embodiment of the present disclosure.

Optionally, as shown in FIG. 9, the device further includes:

a receiving module 803, configured to receive configuration information sent by the network side device, wherein the configuration information is used for antenna panel information of the terminal for uplink transmission.

Figure 10:
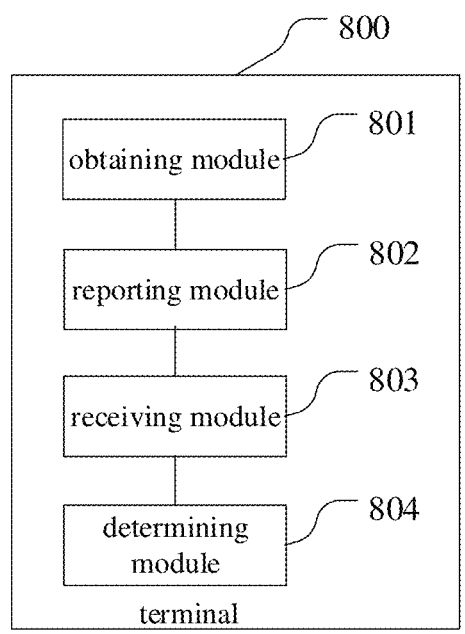
FIG. 10 is still yet another structural diagram of a terminal provided by an embodiment of the present disclosure.

Optionally, as shown in FIG. 10, the device further includes:

a determining module 804, configured to determine the antenna panel for the uplink transmission according to the configuration information.

It should be noted that the above-mentioned terminal 800 in this embodiment may be a terminal of any implementation in the method embodiment shown in FIG. 3, and any implementation of the terminal in the method embodiment shown in FIG. 3 can be implemented by the above-mentioned terminal 800 in this embodiment, and achieve the same beneficial effects, which will not be repeated here.

Figure 11:
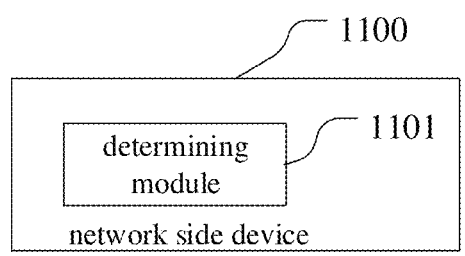
FIG. 11 is a structural diagram of a network side device provided by an embodiment of the present disclosure.

FIG. 11 is a structural diagram of a network side device provided by an embodiment of the present disclosure. As shown in FIG. 11, the network side device 1100 includes:

a determining module 1101, configured to determine uplink transmission characteristic of the terminal, wherein the uplink transmission characteristic is an antenna panel for the uplink transmission determined by the network side device according to the first information, or the uplink transmission characteristic is determined by the network side device according to the first information and second information, and the second information includes panel relationship information of the terminal;

The first information includes information reported by the terminal to the network side device or information sent by the network side device to the terminal.

Optionally, in the case that the uplink transmission characteristic is the antenna panel of uplink transmission determined by the network side device according to the first information:

The information sent by the network side device to the terminal includes a downlink signal, and the downlink signal is used to indicate uplink beam information used by the terminal or indicate information of the antenna panel for the uplink transmission.

Optionally, the downlink signal is associated with the antenna panel for the uplink transmission; or The uplink beam information is associated with the antenna panel for the uplink transmission.

Optionally, associating the downlink signal with the antenna panel for uplink transmission includes:

Associating the downlink signal with antenna panel information of the antenna panel for uplink transmission.

Wherein, the antenna panel information may include but is not limited to the following items:

An identifier of the antenna panel for the uplink transmission;
An identifier of a sounding reference signal (SRS) resource for the uplink transmission;
An identifier of a SRS resource set for the uplink transmission;
An identifier of a SRS resource group for the uplink transmission.

Optionally, the associating the downlink signal with the antenna panel for the uplink transmission is configured by the network side to the terminal.

Optionally, in the case that the uplink transmission characteristic is the antenna panel for uplink transmission determined by the network side device according to the first information:

The information reported by the terminal to the network side device is used to report the antenna panel information for the uplink transmission.

Optionally, the information reported by the terminal to the network side device is: information reported by the terminal most recently before determining the antenna panel for uplink transmission.

Optionally, the information reported by the terminal to the network side device includes:

Information reported by the terminal according to the measurement result of the downlink reference signal of the network side device, and the report information includes reference signal resource indication information and the antenna panel information for the uplink transmission.

Optionally, in the case that the uplink transmission characteristic is an uplink transmission characteristic determined by the terminal according to the first information and the second information:

The panel relationship information includes:

Panel relationship information between uplink transmission and downlink reception of the terminal.

Optionally, the panel relationship information between uplink transmission and downlink transmission of the terminal, including:

The relationship information between the antenna panel information for the uplink transmission and the antenna panel information for downlink reception of the terminal; or The relationship information between transmission characteristic information of the panel of the terminal for uplink transmission and the reception characteristic information of the panel of the terminal for downlink reception.

Optionally, the antenna panel information may include the following:

An identifier of the antenna panel for the uplink transmission;

An identifier of an SRS resource for the uplink transmission;

An identifier of an SRS resource set for the uplink transmission;

An identifier of an SRS resource group for the uplink transmission.

The transmission characteristic information may include, but is not limited to, at least one of the following:

A spatial filter for uplink transmission, a transmission beam for uplink transmission, a power control for uplink transmission, a timing for uplink transmission and Doppler information for uplink transmission;

and/or,

The reception characteristic information may include, but is not limited to, at least one of the following:

A spatial filter of downlink transmission, a transmission beam for downlink transmission, a path loss for downlink transmission, a timing for downlink transmission and Doppler information for downlink transmission.

Optionally, the panel relationship information is predefined, configured by the network side to the terminal, or reported by the terminal to the network side.

Optionally, in the case that the uplink transmission characteristic is an uplink transmission characteristic determined by the terminal according to the first information and the second information:

The uplink transmission characteristics include at least one of the following:

An antenna panel for uplink transmission, a spatial filter for uplink transmission, a transmission beam for uplink transmission, a power control for uplink transmission, a timing for uplink transmission and a Doppler pre-compensation for uplink transmission.

Figure 12:
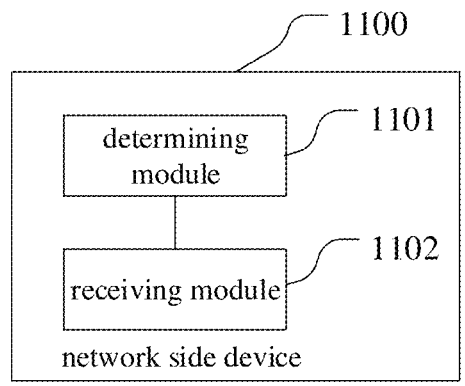
FIG. 12 is another structural diagram of a network side device provided by an embodiment of the present disclosure.

Optionally, as shown in FIG. 12, the device further includes:

A receiving module 1102, configured to receive the uplink transmission characteristic reported by the terminal.

It should be noted that the network side device 1100 in this embodiment may be a network side device in any implementation in the method embodiment shown in FIG. 4. Any implementation shown in this embodiment can be implemented by the above-mentioned network side device 1100 in this embodiment, and achieve the same beneficial effects, which will not be repeated here.

Figure 13:
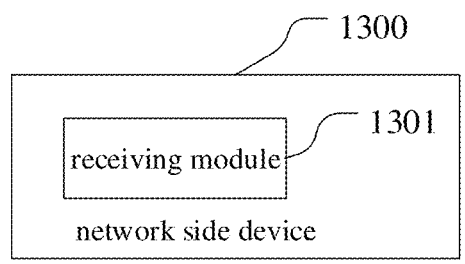
FIG. 13 is still another structural diagram of a network side device provided by an embodiment of the present disclosure.

FIG. 13 is another structural diagram of a network side device provided by an embodiment of the present disclosure. As shown in FIG. 13, the network side device 1300 includes:

a receiving module 1301, configured to receive report information reported by a terminal, wherein the report information includes information of an antenna panel of the terminal, and/or the report information is obtained based on the information of the antenna panel indicated by the network side device.

Optionally, the report information is a measurement result, wherein the measurement result is measured by the terminal based on the indication information sent by the network side device.

Optionally, in the case that the report information is obtained based on the information of the antenna panel indicated by the network side device: the information of the antenna panel indicated by the network side device may be the information of the antenna panel of the terminal included in the indication information; or In the case that the report information includes the information of the antenna panel of the terminal: the information of the antenna panel of the terminal may be the information of the antenna panel of the terminal included in the measurement result; or In the case that the report information includes information of the antenna panel of the terminal, and the report information is obtained based on the information of the antenna panel indicated by the network side device: the information of the antenna panel indicated by the network side device may be the information of the antenna panel of the terminal included in the indication information, and the information of the antenna panel of the terminal may be the information of the antenna panel of the terminal included in the measurement result.

Optionally, the antenna panel information may include but is not limited to the following items:

An identifier of the antenna panel for the uplink transmission;

An identifier of a sounding reference signal (SRS) resource for the uplink transmission;

An identifier of a SRS resource set for the uplink transmission;

An identifier of a SRS resource group for the uplink transmission.

Optionally, in the case that the report information includes information of the antenna panel of the terminal: the report information is assistant information used to assist in determining the antenna panel of the terminal for uplink transmission.

Optionally, the report information includes at least one of the following:

a number of antenna panels of the terminal, an activation time of the antenna panels, and a number of ports of the antenna panels.

Optionally, the antenna panel associated with the report information is an antenna panel that can be activated and used for uplink transmission.

Optionally, the report information is used to explicitly report the antenna panel information of the terminal, or the report information is implicitly reported as the capability of the terminal.

Figure 14:
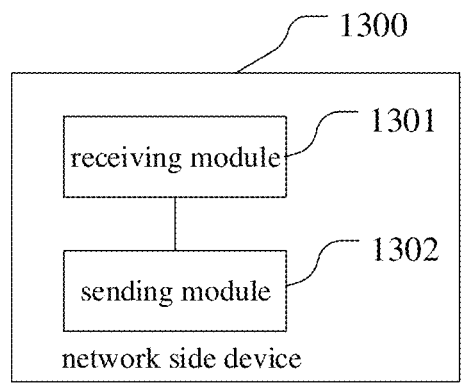
FIG. 14 is still yet another structural diagram of a network side device provided by an embodiment of the present disclosure.

Optionally, as shown in FIG. 14, the device further includes:

a sending module 1302, configured to send configuration information to the terminal, wherein the configuration information is used for antenna panel information of the terminal for uplink transmission.

It should be noted that the network side device 1300 in this embodiment may be a network side device in any implementation in the method embodiment shown in FIG. 5. Any implementation shown in this embodiment can be implemented by the above-mentioned network side device 1300 in this embodiment, and achieve the same beneficial effects, which will not be repeated here.

Figure 15:
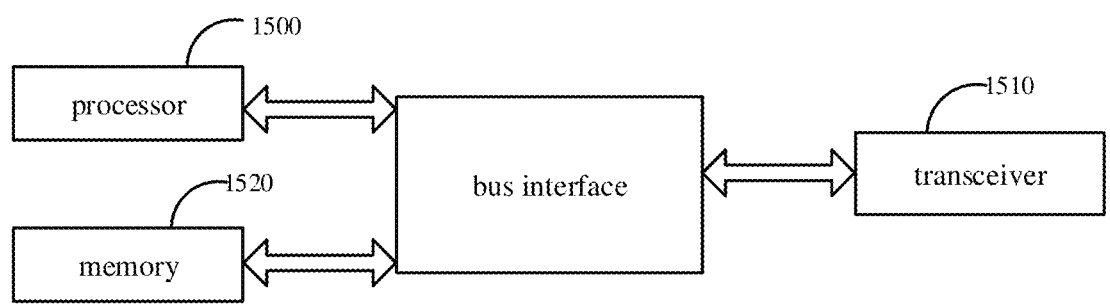
FIG. 15 is still yet another structural diagram of a terminal provided by an embodiment of the present disclosure.

FIG. 15 is another structural diagram of a terminal provided by an embodiment of the present disclosure. As shown in FIG. 15, the terminal includes: a transceiver 1510, a memory 1520, a processor 1500, and a program stored on the memory 1520 and executed by the processor 1500, wherein:

The transceiver 1510 may be used to receive and transmit data under the control of the processor 1500.

In FIG. 15, the bus architecture may include any number of interconnected buses and bridges, in particular various circuits of one or more processors represented by processor 1500 and memory represented by memory 1520 linked together. The bus architecture may also link together various other circuits, such as peripherals, voltage regulators, and power management circuits, which are well known in the art and, therefore, will not be described further herein. The bus interface provides the interface. Transceiver 1510 may be a number of elements, including a transmitter and a receiver, a unit for communicating with various other devices over a transmission medium.

The processor 1500 is responsible for managing the bus architecture and general processing, and the memory 1520 may store data used by the processor 1500 in performing operations.

It should be noted that, the memory 1520 is not limited to only on the terminal, and the memory 1520 and the processor 1500 may be separated and located in different geographical locations.

In one embodiment:

The transceiver 1510 is configured to obtain first information, wherein the first information includes information reported by the terminal to a network side device or information received by the terminal from the network side device;

The transceiver 1510 or the processor 1500, configured to determine uplink transmission characteristic of the terminal, wherein the uplink transmission characteristic is an antenna panel for the uplink transmission determined by the terminal according to the first information, or the uplink transmission characteristic is determined by the terminal according to the first information and second information, and the second information includes panel relationship information of the terminal.

Optionally, in the case that the uplink transmission characteristic is the antenna panel of uplink transmission determined by the terminal according to the first information:

The information received by the terminal from the network side device includes a downlink signal, and the downlink signal is used to indicate uplink beam information used by the terminal or indicate information of the antenna panel for the uplink transmission.

Optionally, the downlink signal is associated with the antenna panel for the uplink transmission; or The uplink beam information is associated with the antenna panel for the uplink transmission.

Optionally, associating the downlink signal with the antenna panel for uplink transmission includes:

Associating the downlink signal with antenna panel information of the antenna panel for uplink transmission.

Wherein, the antenna panel information may include but is not limited to the following items:

An identifier of the antenna panel for the uplink transmission;

An identifier of a sounding reference signal (SRS) resource for the uplink transmission;

An identifier of a SRS resource set for the uplink transmission;

An identifier of a SRS resource group for the uplink transmission.

Optionally, the associating the downlink signal with the antenna panel for the uplink transmission is configured by the network side to the terminal.

Optionally, in the case that the uplink transmission characteristic is the antenna panel for uplink transmission determined by the terminal according to the first information:

The information reported by the terminal to the network side device is used to report the antenna panel information for the uplink transmission.

Optionally, the information reported by the terminal to the network side device is: information reported by the terminal most recently before determining the antenna panel for uplink transmission.

Optionally, the information reported by the terminal to the network side device includes:

Information reported by the terminal according to the measurement result of the downlink reference signal of the network side device, and the report information includes reference signal resource indication information and the antenna panel information for the uplink transmission.

Optionally, in the case that the uplink transmission characteristic is an uplink transmission characteristic determined by the terminal according to the first information and the second information:

The panel relationship information includes:

Panel relationship information between uplink transmission and downlink reception of the terminal.

Optionally, the panel relationship information between uplink transmission and downlink transmission of the terminal, including:

The relationship information between the antenna panel information for the uplink transmission and the antenna panel information for downlink reception of the terminal; or The relationship information between transmission characteristic information of the panel of the terminal for uplink transmission and the reception characteristic information of the panel of the terminal for downlink reception.

Optionally, the antenna panel information may include the following:

An identifier of the antenna panel for the uplink transmission;

An identifier of an SRS resource for the uplink transmission;

An identifier of an SRS resource set for the uplink transmission;

An identifier of an SRS resource group for the uplink transmission.

The transmission characteristic information may include, but is not limited to, at least one of the following:

A spatial filter for uplink transmission, a transmission beam for uplink transmission, a power control for uplink transmission, a timing for uplink transmission and Doppler information for uplink transmission;

and/or,

The reception characteristic information may include, but is not limited to, at least one of the following:

A spatial filter of downlink transmission, a transmission beam for downlink transmission, a path loss for downlink transmission, a timing for downlink transmission and Doppler information for downlink transmission.

Optionally, the panel relationship information is predefined, configured by the network side to the terminal, or reported by the terminal to the network side.

Optionally, in the case that the uplink transmission characteristic is an uplink transmission characteristic determined by the terminal according to the first information and the second information:

The uplink transmission characteristics include at least one of the following:

An antenna panel for uplink transmission, a spatial filter for uplink transmission, a transmission beam for uplink transmission, a power control for uplink transmission, a timing for uplink transmission and a Doppler pre-compensation for uplink transmission.

Optionally, the method further includes:

Receiving, by the network side device, the uplink transmission characteristic reported by the terminal.

Optionally, the transceiver 1510 is also configured to:

report the uplink transmission characteristic to the network side device.

In another embodiment:

The transceiver 1510 or the processor 1500 is configured to configured to obtain report information, wherein the report information includes information of an antenna panel of the terminal, and/or the report information is obtained based on the information of the antenna panel indicated by the network side device;

The transceiver 1510 is configured to report the report information to the network side device.

Optionally, the report information is a measurement result, wherein the measurement result is measured by the terminal based on the indication information sent by the network side device.

Optionally, in the case that the report information is obtained based on the information of the antenna panel indicated by the network side device: the information of the antenna panel indicated by the network side device may be the information of the antenna panel of the terminal included in the indication information; or In the case that the report information includes the information of the antenna panel of the terminal: the information of the antenna panel of the terminal may be the information of the antenna panel of the terminal included in the measurement result; or In the case that the report information includes information of the antenna panel of the terminal, and the report information is obtained based on the information of the antenna panel indicated by the network side device: the information of the antenna panel indicated by the network side device may be the information of the antenna panel of the terminal included in the indication information, and the information of the antenna panel of the terminal may be the information of the antenna panel of the terminal included in the measurement result.

Optionally, the antenna panel information may include but is not limited to the following items:

An identifier of the antenna panel for measurement;

An identifier of a sounding reference signal (SRS) resource for measurement;

An identifier of a SRS resource set for measurement;

An identifier of a SRS resource group for measurement.

Optionally, the report information is assistant information used to assist in determining an antenna panel of the terminal for uplink transmission.

Optionally, in the case that the report information includes information of the antenna panel of the terminal: the report information is assistant information used to assist in determining the antenna panel of the terminal for uplink transmission.

Optionally, the report information includes at least one of the following:

a number of antenna panels of the terminal, an activation time of the antenna panels, and a number of ports of the antenna panels.

Optionally, the antenna panel associated with the report information is an antenna panel that can be activated and used for uplink transmission.

Optionally, the report information is used to explicitly report the antenna panel information of the terminal, or the report information is implicitly reported as the capability of the terminal.

Optionally, the transceiver 1510 is also configured to:

receive configuration information sent by the network side device, wherein the configuration information is used for antenna panel information of the terminal for uplink transmission.

Optionally, the transceiver 1510 or the processor 1500 is further configured to:

determine the antenna panel for the uplink transmission according to the configuration information.

It should be noted that the above-mentioned terminal in this embodiment may be a terminal of any implementation in the method embodiment, and any implementation of the terminal in the method embodiment may be implemented by the terminal in this embodiment, and the same beneficial effects are achieved, will not be repeated here.

Figure 16:
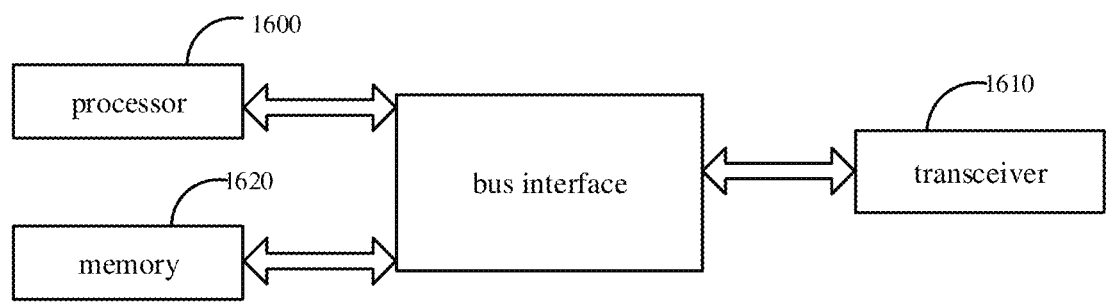
FIG. 16 is still yet another structural diagram of a network side device provided by an embodiment of the present disclosure.

FIG. 16 is another structural diagram of a network side device provided by an embodiment of the present disclosure. As shown in FIG. 16, the network side device includes: a transceiver 1610, a memory 1620, a processor 1600, and a program storage on the memory 1620 and executed by the processor, wherein:

The transceiver 1610 may be used to receive and transmit data under the control of the processor 1600.

In FIG. 16, the bus architecture may include any number of interconnected buses and bridges, in particular various circuits of one or more processors represented by processor 1600 and memory represented by memory 1620 linked together. The bus architecture may also link together various other circuits, such as peripherals, voltage regulators, and power management circuits, which are well known in the art and, therefore, will not be described further herein. The bus interface provides the interface. Transceiver 1610 may be a number of elements, including a transmitter and a receiver, a unit for communicating with various other devices over a transmission medium.

The processor 1600 is responsible for managing the bus architecture and general processing, and the memory 1620 may store data used by the processor 1600 in performing operations.

It should be noted that, the memory 1620 is not limited to only on the network side device, and the memory 1620 and the processor 1600 may be separated and located in different geographical locations.

In one embodiment:

The transceiver 1610 or the processor 1600 is configured to determine uplink transmission characteristic of the terminal, wherein the uplink transmission characteristic is an antenna panel for the uplink transmission determined by the network side device according to the first information, or the uplink transmission characteristic is determined by the network side device according to the first information and second information, and the second information includes panel relationship information of the terminal;

The first information includes information reported by the terminal to the network side device or information sent by the network side device to the terminal.

Optionally, in the case that the uplink transmission characteristic is the antenna panel of uplink transmission determined by the network side device according to the first information:

The information sent by the network side device to the terminal includes a downlink signal, and the downlink signal is used to indicate uplink beam information used by the terminal or indicate information of the antenna panel for the uplink transmission.

Optionally, the downlink signal is associated with the antenna panel for the uplink transmission; or The uplink beam information is associated with the antenna panel for the uplink transmission.

Optionally, associating the downlink signal with the antenna panel for uplink transmission includes:

Associating the downlink signal with antenna panel information of the antenna panel for uplink transmission.

Wherein, the antenna panel information may include but is not limited to the following items:

An identifier of the antenna panel for the uplink transmission;

An identifier of a sounding reference signal (SRS) resource for the uplink transmission;

An identifier of a SRS resource set for the uplink transmission;

An identifier of a SRS resource group for the uplink transmission.

Optionally, the associating the downlink signal with the antenna panel for the uplink transmission is configured by the network side to the terminal.

Optionally, in the case that the uplink transmission characteristic is the antenna panel for uplink transmission determined by the network side device according to the first information:

The information reported by the terminal to the network side device is used to report the antenna panel information for the uplink transmission.

Optionally, the information reported by the terminal to the network side device is: information reported by the terminal most recently before determining the antenna panel for uplink transmission.

Optionally, the information reported by the terminal to the network side device includes:

Information reported by the terminal according to the measurement result of the downlink reference signal of the network side device, and the report information includes reference signal resource indication information and the antenna panel information for the uplink transmission.

Optionally, in the case that the uplink transmission characteristic is an uplink transmission characteristic determined by the terminal according to the first information and the second information:

The panel relationship information includes:

Panel relationship information between uplink transmission and downlink reception of the terminal.

Optionally, the panel relationship information between uplink transmission and downlink transmission of the terminal, including:

The relationship information between the antenna panel information for the uplink transmission and the antenna panel information for downlink reception of the terminal; or The relationship information between transmission characteristic information of the panel of the terminal for uplink transmission and the reception characteristic information of the panel of the terminal for downlink reception.

Optionally, the antenna panel information may include the following:

An identifier of the antenna panel for the uplink transmission;

An identifier of an SRS resource for the uplink transmission;

An identifier of an SRS resource set for the uplink transmission;

An identifier of an SRS resource group for the uplink transmission.

The transmission characteristic information may include, but is not limited to, at least one of the following:

A spatial filter for uplink transmission, a transmission beam for uplink transmission, a power control for uplink transmission, a timing for uplink transmission and Doppler information for uplink transmission;

and/or,

The reception characteristic information may include, but is not limited to, at least one of the following:

A spatial filter of downlink transmission, a transmission beam for downlink transmission, a path loss for downlink transmission, a timing for downlink transmission and Doppler information for downlink transmission.

Optionally, the panel relationship information is predefined, configured by the network side to the terminal, or reported by the terminal to the network side.

Optionally, in the case that the uplink transmission characteristic is an uplink transmission characteristic determined by the terminal according to the first information and the second information:

The uplink transmission characteristics include at least one of the following:

An antenna panel for uplink transmission, a spatial filter for uplink transmission, a transmission beam for uplink transmission, a power control for uplink transmission, a timing for uplink transmission and a Doppler pre-compensation for uplink transmission.

Optionally, transceiver 1610 is also configured to:

Receive the uplink transmission characteristic reported by the terminal.

In another embodiment:

The transceiver 1610 is configured to receive report information reported by a terminal, wherein the report information includes information of an antenna panel of the terminal, and/or the report information is obtained based on the information of the antenna panel indicated by the network side device.

Optionally, the report information is a measurement result, wherein the measurement result is measured by the terminal based on the indication information sent by the network side device.

Optionally, in the case that the report information is obtained based on the information of the antenna panel indicated by the network side device: the information of the antenna panel indicated by the network side device may be the information of the antenna panel of the terminal included in the indication information; or In the case that the report information includes the information of the antenna panel of the terminal: the information of the antenna panel of the terminal may be the information of the antenna panel of the terminal included in the measurement result; or In the case that the report information includes information of the antenna panel of the terminal, and the report information is obtained based on the information of the antenna panel indicated by the network side device: the information of the antenna panel indicated by the network side device may be the information of the antenna panel of the terminal included in the indication information, and the information of the antenna panel of the terminal may be the information of the antenna panel of the terminal included in the measurement result.

Optionally, the antenna panel information may include but is not limited to the following items:
  An identifier of the antenna panel for the uplink transmission;
  An identifier of a sounding reference signal (SRS) resource for the uplink transmission;
  An identifier of a SRS resource set for the uplink transmission;
  An identifier of a SRS resource group for the uplink transmission.

Optionally, the report information is assistant information used to assist in determining an antenna panel of the terminal for uplink transmission.

Optionally, in the case that the report information includes information of the antenna panel of the terminal: the report information is assistant information used to assist in determining the antenna panel of the terminal for uplink transmission.

Optionally, the report information includes at least one of the following:
  a number of antenna panels of the terminal, an activation time of the antenna panels, and a number of ports of the antenna panels.

Optionally, the antenna panel associated with the report information is an antenna panel that can be activated and used for uplink transmission.

Optionally, the report information is used to explicitly report the antenna panel information of the terminal, or the report information is implicitly reported as the capability of the terminal.

Optionally, transceiver 1610 is also configured to:

Sending, by the network side device, configuration information to the terminal, wherein the configuration information is used for antenna panel information of the terminal for uplink transmission.

It should be noted that the above-mentioned network side device in this embodiment may be a network side device in any implementation in the method embodiment in the embodiment of the present disclosure, and any implementation in the network side device in the method embodiment may be implemented by the above-mentioned network side device in this embodiment, and achieves the same beneficial effects, which will not be repeated here.

Embodiments of the present disclosure further provide a computer-readable storage medium on which a computer program is stored, wherein when the program is executed by a processor, the steps in the uplink transmission characteristics confirmation method on the terminal side provided by the embodiments of the present disclosure are implemented, or, when the program is executed by the processor, the steps in the information report method on the terminal side provided by the embodiment of the present disclosure are implemented, or when the program is executed by the processor, the step for the uplink transmission characteristic confirmation method on the network side device side provided by the embodiment of the present disclosure is implemented, or, when the program is executed by the processor, the steps in the information report method on the network side device side provided by the embodiment of the present disclosure is implemented.

In the several embodiments provided in this disclosure, it should be understood that the disclosed method and device may be implemented in other manners. For example, the device embodiments described above are only illustrative. For example, the division of the units is only a logical function division. In actual implementation, there may be other division methods. For example, multiple units or components may be combined or integrated into another system, or some features can be ignored, or not implemented. On the other hand, the shown or discussed mutual coupling or direct coupling or communication connection may be through some interfaces, indirect coupling or communication connection of devices or units, and may be in electrical, mechanical or other forms.

In addition, each functional unit in each embodiment of the present disclosure may be integrated into one processing unit, or each unit may be physically included individually, or two or more units may be integrated into one unit. The above-mentioned integrated unit may be implemented in the form of hardware, or may be implemented in the form of hardware plus software functional units.

The above-mentioned integrated units implemented in the form of software functional units can be stored in a computer-readable storage medium. The above-mentioned software functional unit is stored in a storage medium, and includes several instructions to cause a computer device (which may be a personal computer, a server, or a network device, etc.) to execute part of the method for processing information data blocks described in various embodiments of the present disclosure. The storage medium includes: U disk, mobile hard disk, Read-Only Memory (ROM), Random Access Memory (RAM), magnetic disk or CD, and other medium for storing program codes.

It should be noted that that the division of the above modules is only a division of logical functions, and in actual implementation, all or part of modules may be integrated into a physical entity, or may be physically separated. And these modules can all be implemented in the form of software called by processing elements; they can also all be implemented in hardware; some modules can also be implemented in the form of calling software by processing elements, and some modules can be implemented in hardware. For example, the determination module may be a separately established processing element, or may be integrated into a certain chip of the above-mentioned device to be implemented, in addition, it may also be stored in the memory of the above-mentioned device in the form of program code, and a certain processing element of the above-mentioned device may call and execute the function of the above determined module. The implementation of other modules is similar. In addition, all or part of these modules can be integrated together, and can also be implemented independently. The processing element described here may be an integrated circuit with signal processing capability. In the implementation process, each step of the above-mentioned method or each of the above-mentioned modules can be completed by an integrated logic circuit of hardware in the processor element or an instruction in the form of software.

For example, each module, unit, sub-unit or sub-module may be one or more integrated circuits configured to implement the above method, such as: one or more Application Specific Integrated Circuits (ASIC), or, one or more microprocessors (digital signal processors, DSP), or, one or more field programmable gate arrays (FPGA), etc. For another example, when one of the above modules is implemented in the form of a processing element calling program code, the processing element may be a general-purpose processor, such as a central processing unit (CPU) or other processors that can invoke program codes. For another example, these modules can be integrated together and implemented in the form of a system-on-a-chip (SOC).

The terms "first", "second", etc. in the description and claims of the present disclosure are used to distinguish similar objects, and are not necessarily used to describe a specific order or sequence. It is to be understood that the data can be interchanged under appropriate circumstances such that the embodiments of the disclosure described herein are implemented in sequences other than those illustrated or described herein, for example. Furthermore, the terms "comprising" and "having", and any variations thereof, are intended to cover non-exclusive inclusion, for example, a process, method, system, product or device comprising a series of steps or units is not necessarily limited to those expressly listed, those steps or units may include other steps or units not expressly listed or inherent to these processes, methods, products or devices. In addition, the use of "and/or" in the specification and the claims means at least one of the linked objects, such as A and/or B and/or C, is meant to include A alone, B alone, C alone, and both A and B, B and C, A and C, and A, B, and C. Similarly, the use of "at least one of A and B" in this disclosure and in the claims should be understood to mean "A alone, B alone, or both A and B present."

The above are optional embodiments of the present disclosure. It should be pointed out that for those skilled in the art, several improvements and modifications can be made without departing from the principles described in the present disclosure. These improvements and modifications should also be fall in the protection scope of the present disclosure.

What is claimed is:

1. An uplink transmission characteristics confirmation method, comprising:
   obtaining, by a terminal, first information, wherein the first information includes information reported by the terminal to a network side device or information received by the terminal from the network side device;
   determining uplink transmission characteristic of the terminal, wherein the uplink transmission characteristic is determined by the terminal according to the first information and second information, and the second information includes panel relationship information of the terminal;
   the uplink transmission characteristics include at least one of the following:
   a spatial filter for uplink transmission, a transmission beam for uplink transmission, a power control for uplink transmission, a timing for uplink transmission or a Doppler pre-compensation for uplink transmission;
   wherein the panel relationship information includes:
   panel relationship information between uplink transmission and downlink reception of the terminal;
   wherein the panel relationship information between uplink transmission and downlink transmission of the terminal, includes:
   relationship information between transmission characteristic information of the panel of the terminal for uplink transmission and reception characteristic information of the panel of the terminal for downlink reception;
   wherein the reception characteristic information includes:
   a path loss for downlink transmission, a timing for downlink transmission and Doppler information for downlink transmission.

2. The method according to claim 1, wherein,
   the information received by the terminal from the network side device includes a downlink signal, and the downlink signal is used to indicate uplink beam information used by the terminal or indicate the antenna panel information for the uplink transmission.

3. The method according to claim 2, wherein the downlink signal is associated with the antenna panel for the uplink transmission; or
   the uplink beam information is associated with the antenna panel for the uplink transmission.

4. The method according to claim 3, wherein associating the downlink signal with the antenna panel for uplink transmission includes:
   associating the downlink signal with antenna panel information of the antenna panel for uplink transmission.

5. The method according to claim 4, wherein the antenna panel information includes one of the following items:
   an identifier of the antenna panel for the uplink transmission;
   an identifier of a sounding reference signal (SRS) resource for the uplink transmission;
   an identifier of a SRS resource set for the uplink transmission;
   an identifier of a SRS resource group for the uplink transmission.

6. The method according to claim 3, wherein association between the downlink signal and the antenna panel for the uplink transmission is configured by the network side device to the terminal.

7. The method according to claim 1, wherein
   the information reported by the terminal to the network side device is used to report the antenna panel information for the uplink transmission,
   wherein the information reported by the terminal to the network side device includes: information reported by the terminal most recently before determining the antenna panel for uplink transmission,
   or
   wherein the information reported by the terminal to the network side device includes:
   information reported by the terminal according to a measurement result of a downlink reference signal of the network side device, and the reported information includes reference signal resource indication information and the antenna panel information for the uplink transmission.

8. The method according to claim 1,
   wherein the transmission characteristic information includes at least one of the following:
   a spatial filter for uplink transmission, a transmission beam for uplink transmission, a power control for uplink transmission, a timing for uplink transmission or Doppler information for uplink transmission.

9. The method according to claim 1, wherein the panel relationship information is predefined, configured by the network side device to the terminal, or reported by the terminal to the network side device.

10. The method according to claim 1, further comprising:
    reporting, by the terminal, the uplink transmission characteristic to the network side device.

11. An uplink transmission characteristics conformation method, comprising:
    determining, by a network side device, uplink transmission characteristic of a terminal, wherein the uplink transmission characteristic is determined by the network side device according to the first information and second information, and the second information includes panel relationship information of the terminal;
    wherein the first information includes information reported by the terminal to the network side device or information sent by the network side device to the terminal;

the uplink transmission characteristics include at least one of the following:

a spatial filter for uplink transmission, a transmission beam for uplink transmission, a power control for uplink transmission, a timing for uplink transmission or a Doppler pre-compensation for uplink transmission;

wherein the panel relationship information includes:

panel relationship information between uplink transmission and downlink reception of the terminal;

wherein the panel relationship information between uplink transmission and downlink transmission of the terminal, includes:

relationship information between transmission characteristic information of the panel of the terminal for uplink transmission and reception characteristic information of the panel of the terminal for downlink reception;

wherein the reception characteristic information includes:

a path loss for downlink transmission, a timing for downlink transmission and Doppler information for downlink transmission.

12. A terminal comprising: a transceiver, a memory, a processor, and a program stored on the memory and executed by the processor, so as to implement the uplink transmission characteristics confirmation method according to claim 1.

13. A network side device, being a first network side device, comprising: a transceiver, a memory, a processor, and a program stored in the memory and executed by the processor, to implement the uplink transmission characteristics confirmation method according to claim 11.

* * * * *